(12) United States Patent
Carrender et al.

(10) Patent No.: US 7,193,504 B2
(45) Date of Patent: Mar. 20, 2007

(54) METHODS AND APPARATUSES FOR IDENTIFICATION

(75) Inventors: Curt Carrender, Morgan Hill, CA (US); John M. Price, Morgan Hill, CA (US); Frederick A. Nylander, Morgan Hill, CA (US); John H. Rolin, Morgan Hill, CA (US); Roger G. Stewart, Morgan Hill, CA (US)

(73) Assignee: Alien Technology Corporation, Morgan Hill, CA (US)

( * ) Notice: Subject to any disclaimer, the term of this patent is extended or adjusted under 35 U.S.C. 154(b) by 598 days.

(21) Appl. No.: 10/267,924

(22) Filed: Oct. 8, 2002

(65) Prior Publication Data
US 2003/0137403 A1    Jul. 24, 2003

Related U.S. Application Data

(60) Provisional application No. 60/328,360, filed on Oct. 9, 2001.

(51) Int. Cl.
*H04Q 5/22* (2006.01)

(52) U.S. Cl. .................. 340/10.4; 340/10.1; 340/10.2; 340/572.4; 340/572.2; 340/825.69; 340/825.72; 340/10.41; 340/10.42; 340/10.5; 340/10.51

(58) Field of Classification Search ............... 340/10.1, 340/10.2, 10.32, 10.42, 10.33, 572.2, 572.4, 340/571.1, 825.69, 825.72, 10.41, 10.5, 10.51
See application file for complete search history.

(56) References Cited

U.S. PATENT DOCUMENTS

| | | | |
|---|---|---|---|
| 4,107,675 A | 8/1978 | Sellers et al. | |
| RE31,375 E | 9/1983 | Sellers et al. | |
| 4,495,496 A | * 1/1985 | Miller, III | .................. 340/10.2 |
| 4,510,495 A | 4/1985 | Sigrimis et al. | |
| 4,785,291 A | * 11/1988 | Hawthorne | .............. 340/573.4 |
| 4,822,990 A | 4/1989 | Tamada et al. | |
| 5,053,774 A | 10/1991 | Schuermann et al. | |

(Continued)

FOREIGN PATENT DOCUMENTS

EP    0 702 324 A2    3/1996

OTHER PUBLICATIONS

PCT Invitation to Pay Additional Fees for PCT International Appln No. US02/17159, mailed Oct. 16, 2002 (9 pages).

*Primary Examiner*—Brian Zimmerman
*Assistant Examiner*—Vernal Brown
(74) *Attorney, Agent, or Firm*—Blakely, Sokoloff, Taylor & Zafman LLP

(57) ABSTRACT

An identification system includes a reader and one or more tags. The reader identifies tags such as radio frequency (RF) tags. The system divides a number space into n bins, wherein each bin is associated with m unique bits of the number space, and the number space contains the identification codes of the tags. A command is issued to test v bits of the number space. A response is received from a tag, wherein the response occurs when a first portion of an identification code of the tag matches the v bits of the number space. A timing of the response corresponds to a particular bin and m unique bits associated with the particular bin correspond to a second portion of the identification code.

12 Claims, 22 Drawing Sheets

U.S. PATENT DOCUMENTS

| | | |
|---|---|---|
| 5,063,386 A | 11/1991 | Bourdeau et al. |
| 5,144,314 A | 9/1992 | Malmberg et al. |
| 5,245,534 A | 9/1993 | Waterhouse et al. |
| 5,266,925 A | 11/1993 | Vercellotti et al. |
| 5,305,008 A | 4/1994 | Turner et al. |
| 5,339,073 A * | 8/1994 | Dodd et al. ................. 340/5.61 |
| 5,365,551 A | 11/1994 | Snodgrass et al. |
| 5,387,915 A | 2/1995 | Moussa et al. |
| 5,387,993 A | 2/1995 | Heller et al. |
| 5,398,326 A | 3/1995 | Lee |
| 5,438,335 A | 8/1995 | Schuermann et al. |
| 5,444,448 A | 8/1995 | Schuermann et al. |
| 5,491,482 A | 2/1996 | Dingwall et al. |
| 5,500,650 A | 3/1996 | Snodgrass et al. |
| 5,502,445 A | 3/1996 | Dingwall et al. |
| 5,548,291 A | 8/1996 | Meier et al. |
| 5,583,850 A | 12/1996 | Snodgrass et al. |
| 5,604,486 A | 2/1997 | Lauro et al. |
| 5,627,544 A | 5/1997 | Snodgrass et al. |
| 5,640,002 A | 6/1997 | Ruppert et al. |
| 5,641,365 A | 6/1997 | Peterson et al. |
| 5,673,037 A * | 9/1997 | Cesar et al. ............. 340/10.32 |
| 5,698,837 A | 12/1997 | Furuta |
| 5,742,238 A | 4/1998 | Fox |
| 5,774,062 A | 6/1998 | Ikefuji |
| 5,774,876 A | 6/1998 | Woolley et al. |
| 5,777,561 A | 7/1998 | Chieu et al. |
| 5,804,810 A | 9/1998 | Woolley et al. |
| 5,841,365 A | 11/1998 | Rimkus |
| 5,850,187 A | 12/1998 | Carrender et al. |
| 5,856,788 A | 1/1999 | Walter et al. |
| 5,874,724 A | 2/1999 | Cato |
| 5,883,582 A | 3/1999 | Bowers et al. |
| 5,892,441 A | 4/1999 | Woolley et al. |
| 5,929,779 A | 7/1999 | MacLellan et al. |
| 5,963,134 A | 10/1999 | Bowers et al. |
| 5,974,078 A | 10/1999 | Tuttle et al. |
| 5,995,019 A | 11/1999 | Chieu et al. |
| 6,021,433 A | 2/2000 | Payne et al. |
| 6,034,603 A | 3/2000 | Steeves |
| 6,036,101 A | 3/2000 | Hass et al. |
| 6,072,801 A | 6/2000 | Wood, Jr. et al. |
| 6,078,258 A | 6/2000 | Auerbach et al. |
| 6,084,512 A | 7/2000 | Elberty et al. |
| 6,089,453 A | 7/2000 | Kayser et al. |
| 6,102,286 A | 8/2000 | Hammond |
| 6,177,858 B1 | 1/2001 | Raimbault et al. |
| 6,236,315 B1 * | 5/2001 | Helms et al. ............ 340/572.7 |
| 6,570,487 B1 * | 5/2003 | Steeves .................... 340/5.2 |
| 6,725,260 B1 * | 4/2004 | Philyaw .................... 709/220 |
| 6,868,073 B1 * | 3/2005 | Carrender .................. 370/278 |
| 2001/0038037 A1 * | 11/2001 | Bridgelall et al. ..... 235/462.14 |

* cited by examiner

[SPINUP][SOF][CMD][P₁][PTR][P₂][LEN][P₃][VALUE][P₄][P₅][EOF]

*Fig. 5*

88 BIT TAG ID MEMORY ARRAY

| TAG BIT NO. | Bits | TAG MEMORY BYTE | TAG MEMORY BITS |
|---|---|---|---|
| | 8 \| 7 \| 6 \| 5 \| 4 \| 3 \| 2 \| 1  — INSTRUCTION | 1 | 1-8 |
| | 16 \| 15 \| 14 \| 13 \| 12 \| 11 \| 10 \| 9 — INSTRUCTION | 2 | 9-16 |
| | 24 \| 23 \| 22 \| 21 \| 20 \| 19 \| 18 \| 17 — INSTRUCTION | 3 | 17-24 |
| | 32 \| 31 \| 30 \| 29 \| 28 \| 27 \| 26 \| 25 — FIELD D / INSTRUCTION | 4 | 25-32 |
| | 40 \| 39 \| 38 \| 37 \| 36 \| 35 \| 34 \| 33 — FIELD E / FIELD D | 5 | 33-40 |
| | 48 \| 47 \| 46 \| 45 \| 44 \| 43 \| 42 \| 41 — FIELD F / FIELD E | 6 | 41-48 |
| | 56 \| 55 \| 54 \| 53 \| 52 \| 51 \| 50 \| 49 — SERIAL / FIELD G / FIELD F | 7 | 49-56 |
| | 64 msb \| 63 \| 62 \| 61 \| 60 \| 59 \| 58 \| 57 — SERIAL / FIELD G | 8 | 57-64 |
| | 72 msb \| 71 \| 70 \| 69 \| 68 \| 67 \| 66 \| 65 — TAG CRC | 9 | 65-72 |
| | 80 \| 79 \| 78 \| 77 \| 76 \| 75 \| 74 \| 73 lsb — TAG CRC | 10 | 73-80 |
| | 88 msb \| 87 \| 86 \| 85 \| 84 \| 83 \| 82 \| 81 — DESTRUCT CODE | 11 | 81-88 |

Fig. 20A

TAG FIELD DEFINITIONS

| FIELD NAME | SIZE | START | END |
|---|---|---|---|
| INSTRUCTION | 20 | 1 | 20 |
| FIELD C | 8 | 21 | 28 |
| FIELD D | 8 | 29 | 36 |
| FIELD E | 8 | 37 | 44 |
| FIELD F | 8 | 45 | 52 |
| SERIAL FIELD G | 12 | 53 | 64 |
| TAG CRC | 16 | 65 | 80 |
| DESTRUCT CODE | 8 | 81 | 88 |

*Fig. 20B*

METHODS AND APPARATUSES FOR IDENTIFICATION

CROSS-REFERENCE TO RELATED APPLICATIONS

The present application is based on co-pending U.S. Provisional Patent Application No. 60/328,360 entitled "Method and Apparatusses for Identification", filed Oct. 9, 2001, the benefit of the filing date of which is claimed under 35 U.S.C. § 119(e).

FIELD OF INVENTION

The present invention relates to the field of identification, and further relates to methods and apparatuses for identifying tags.

BACKGROUND ART

It is desirable to interrogate multiple wireless tags by sending from an interrogating transmitter a code and having information transmitted by the tag in response. This is commonly accomplished by having the tag listen for an interrogation message and for it to respond with a unique serial number and/or other information. However, it is desirable to extend the range of wireless tags so that it is not necessary to bring each tag close to a reader for reading. Two problems often occur when extending the range of the reading system. One of the problems is that there is limited power available for transmission from the wireless tag, and if the range is significant, it is possible that many tags will be within the range of the interrogating system and their replies may corrupt each other. Current implementations of radio frequency (RF) tags require considerable logic to handle interface protocol and anti-collision problems, which occur when multiple tags within the range of a reader attempt to all reply to an interrogating message. For example, current integrated circuits, which are used in RF tags, require nearly 3,000 logic gates to handle an interface protocol and to handle anti-collision protocols. This considerable size required by an integrated circuit increases the cost of the RF tag and thus makes is less likely for such a tag to be more commonly used. Prior art attempts to avoid collisions when reading multiple RF tags are described in U.S. Pat. Nos. 5,266,925 and 5,883,582 and 6,072,801. However, these prior art approaches provide inefficient solutions for avoiding collision when reading multiple RF tags.

SUMMARY OF THE INVENTION

In accordance with aspects of the present invention, a method is performed by a reader to identify a tag, where the tag has an identification code. The method includes transmitting data to the tag, and receiving at least one response to transmitting the data, wherein a timing location of the response corresponds to a first portion of the identification code of the tag. The response includes the first portion of the identification code of the tag.

In another aspect, a method performed by a tag, includes receiving a first data from a reader, correlating the first data with a first portion of an identification code of the tag and transmitting a response to the if the first data matches the first portion of the identification code of the tag. A timing location associated with the transmitting corresponds to a first portion of the identification code of the tag. The response transmitted to the reader includes the first portion of the identification code of the tag.

BRIEF DESCRIPTION OF THE DRAWINGS

The present invention is illustrated by way of example and is not limited in the figures of the accompanying drawings, in which like references indicate similar elements.

FIG. 5 illustrates a Basic Command structure.

FIGS. 20A and 20B illustrate an embodiment of a memory map for a tag's memory.

DETAILED DESCRIPTION OF PREFERRED EMBODIMENTS

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of ordinary skill in the art to practice the invention. The following detailed description is, therefore, not to be taken in a limiting sense, and the scope of the invention is defined only by the appended claims.

Figure 1:
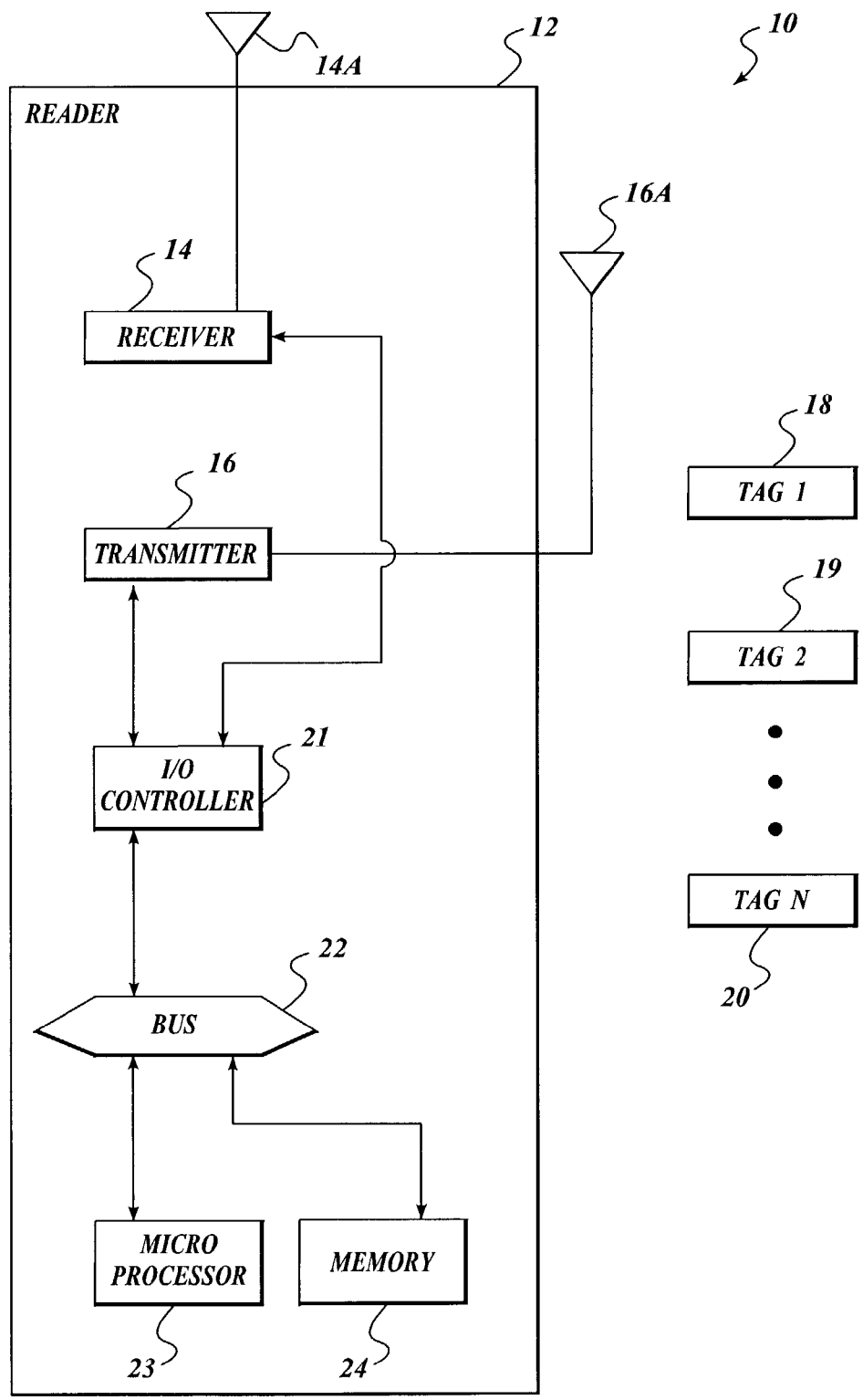
FIG. 1 shows an example of an identification system, which includes a reader, and a plurality of radio frequency (RF) tags.

FIG. 1 illustrates an example of an identification system 10, which includes a reader 12, and a plurality of tags 18, 19, and 20. The system is typically a reader-talks-first RF ID system using either passive or semi-passive active backscatter transponders as tags. The incorporation of a battery and/or memory into a tag is an expanded feature to facilitate longer read range; however, the use of the battery does require certain trade-offs, such as higher costs, limited longevity, larger form factor, greater weight, and end-of-life disposal requirements. Thus the tags 18, 19, and 20 may have memory and/or a battery or may have neither of these elements. It will be appreciated that different types of tags may be mixed in a system where a reader is interrogating tags with batteries and tags without batteries.

There are at least four classes of tags which may be used with the present invention: (1) no power source on the tag except for power which is obtained from the tag's antenna, but the tag does include a read-only memory which has the tag's identification code; (2) a tag without internal power, but when powered from the reader, can write data to non-volatile memory in the tag; this type of tag also includes memory for storing the identification code; (3) a tag with a small battery to provide power to the circuitry in the tag (such a tag may also include non-volatile memory as well as memory for storing the tag's identification code); and (4) a tag which can communicate with other tags or other devices.

FIG. 1 shows an embodiment of a reader. The reader 12 will typically include a receiver 14 and a transmitter 16, each of which are coupled to an I/O (input/output) controller 21. The receiver 14 may have its own antenna 14*a*, and the transmitter 16 may have its own antenna 16*a*. In light of the present disclosure, those skilled in the art will appreciate that the transmitter 16 and the receiver 14 may share the same antenna provided that there is a receive/transmit switch which controls the signal present on the antenna and which isolates the receiver and transmitter from each other. The receiver 14 and the transmitter 16 may be similar to conventional receiver and transmitter units found in current readers. In one embodiment, the receiver and transmitter typically operate, in North America, in a frequency range of about 900 megahertz.

The receiver and transmitter are coupled to the I/O controller 21, which controls the receipt of data from the receiver and the transmission of data, such as commands, from the transmitter 16. The I/O controller is coupled to a bus 22, which is in turn coupled to a microprocessor 23 and a memory 24. There are various different possible implementations, which may be used in the reader 12 for the processing system represented by elements 21, 22, 23, and 24. In one implementation, the microprocessor 23 is a programmable microcontroller, such as an 8051 microcontroller or other well-known microcontrollers or microprocessors (e.g. a PowerPC microprocessor). In one implementation, the memory 24 includes dynamic random access memory and a memory controller that controls the operation of the memory. The memory 24 may also include a non-volatile read only memory for storing data and software programs.

The memory 24 typically contains a program that controls the operation of the microprocessor 23 and contains data used during the processing of tags as in the interrogation of tags. In one embodiment described further below, the memory 24 would typically include a computer program that causes the microprocessor 23 to send search commands through the I/O controller 21 to the transmitter and to receive responses from the tags through the receiver 14 and through the I/O controller 21. The memory 24 would further include a data structure such as a binary tree (e.g. the binary tree shown in FIGS. 4, 9, and 11) in which the tree or a part thereof is created because of the particular search algorithm. One particular search algorithm is further described below. The reader 12 may also include a network interface, such as an Ethernet interface, which allows the reader to communicate with other processing systems through a network. The network interface would typically be coupled to the bus 22 so that it can receive data, such as the list of tags identified in an interrogation either from the microprocessor 23 or from the memory 24.

Figure 2A:
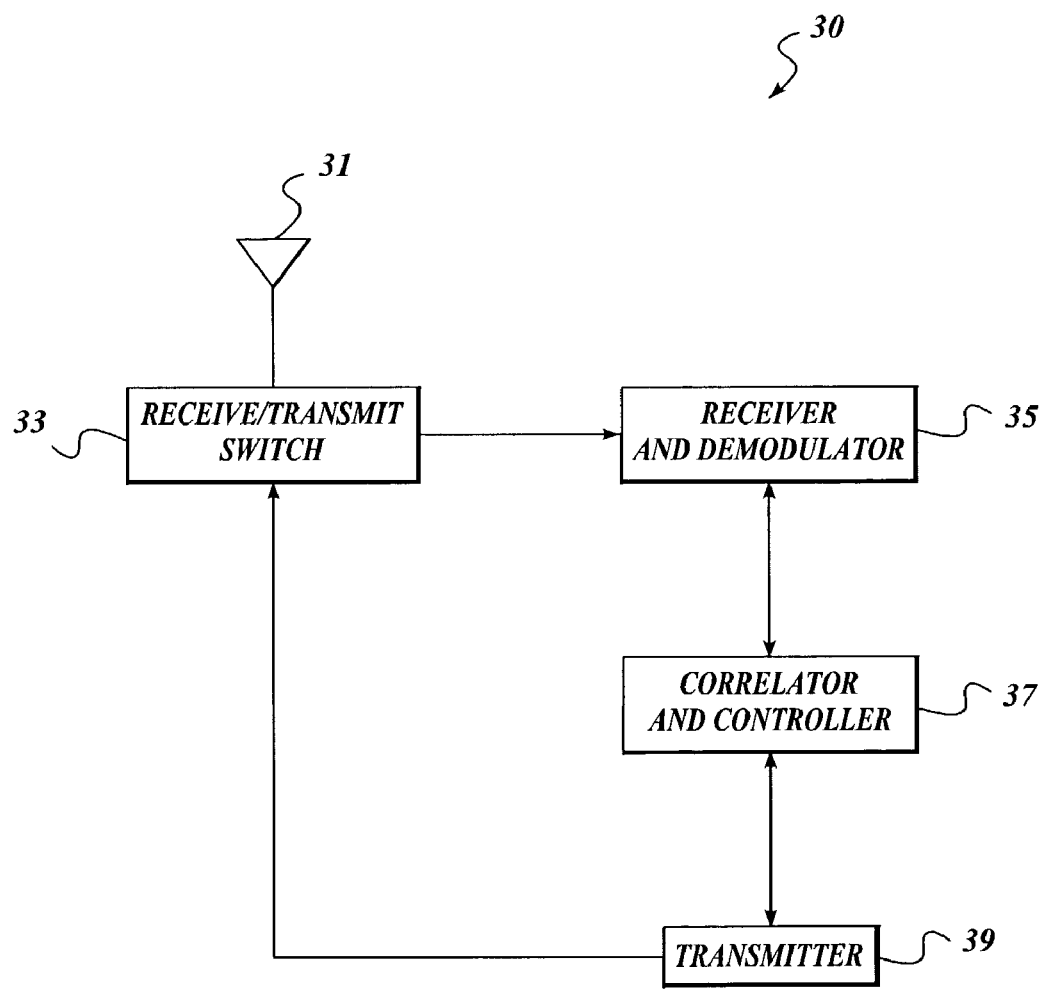
FIG. 2A shows an example of one embodiment of an RF tag, which may be used with the present invention.

FIG. 2A shows an example of one implementation of a tag, which may be used with the present invention. The tag 30 includes an antenna 31, which is coupled to a transmit/receive (TR) switch 33. This switch is coupled to the receiver and demodulator 35 and to the transmitter 39. A correlator and controller unit 37 is coupled to the receiver and demodulator 35 and to the transmitter 39. The particular example shown in FIG. 2A of a tag may be used in various embodiments in which a memory for maintaining data between commands is maintained in the tag and in which a bit by bit correlation occurs in the tag. Such a correlation can be used to perform the "match" described below in response to a command executed by a tag.

The receiver and demodulator 35 receive signals through the antenna 31 and the switch 33 to demodulate the signals and provide these signals to the correlator and controller unit 37. Commands received by the receiver 35 are passed to the controller of the unit 37 in order to control the operation of the tag. Data received by the receiver 35 is also passed to the control unit 37, and this data may be correlated with the tag's identification code in the embodiments described below. The transmitter 39, under control of the control unit 37, transmits responses or other data through the switch 33 and the antenna 31 to the reader. In light of the present disclosure, it will be appreciated by those of ordinary skill in the art that the transmitter may be merely a switch or other device, which modulates reflections from an antenna, such as antenna 31.

Figure 2B:
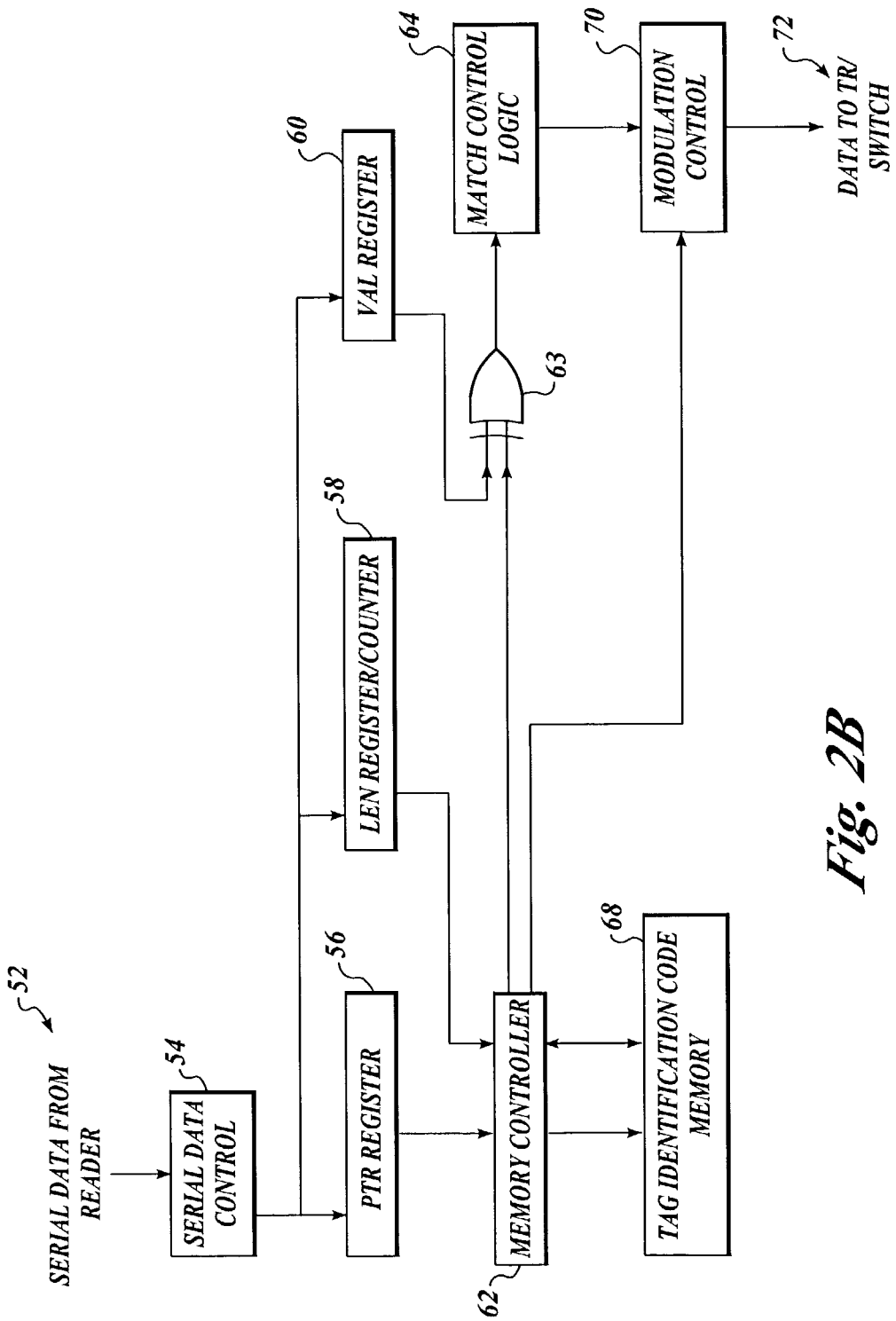
FIG. 2B shows a correlation circuit, which may be used in certain embodiments of RF tags according to the present invention.

FIG. 2B illustrates one embodiment of a correlation system 50 so that can be used in a tag (such as the tag shown in FIG. 2A). The correlation system utilizes a shift register to receive a pointer into the tag memory, a register/down counter to receive the number of bits to be compared to tag memory, and a register to capture the values of the bits to be compared to by the tag. The tag then compares the values of the bits received from the reader to the bits in tag identification memory one bit at a time, as they are received from the reader. If all of the bits match, the tag then responds to the reader. If all of the bits do not match, the tag will not respond to the reader.

Turning to FIG. 2B, serial data 52 is received from the reader. Serial data 52 is validated in Serial data control block 54 and is decoded into commands. A PING command is routed to a PTR Register 56, a LEN Register/Counter 58, and a VAL Register 60 as each bit is received by the Serial data control block 54. A Memory Controller 62 accesses tag identification code memory 68 for the number of bits that are specified is in the LEN Register/Counter 58. For each of the memory accesses, the value of the bit received from the reader in the VAL Register 60 is compared to the value of the bit accessed from memory at XOR logic 63. The output of the comparison performed at XOR logic 63 is passed to a Match Control Logic 64. The Match Control Logic 64 validates that all of the v bits received from the reader in the VAL Register 60 match the appropriate bits of the tag Identification Code stored in Tag Identification Memory 68. The LEN counter within the LEN Register/Counter 58 is decremented and the process continues until all v bits have been tested, at which point the LEN counter reaches zero.

If all v bits match, a response bin is selected by Modulation Control 70 based on the next m least significant bits (LSBS) of the tag identification code. A next z LSBs (z LSBs can include the m LSBs previously mentioned) are modulated and sent to the reader as Data 72 by the Modulation Control 70 and the Transmit/Receive Switch 33 (FIG. 2A).

In light of this disclosure, it will be appreciated by those of ordinary skill in the art that the number of bits sent by the reader, v, is general and may be at least a portion of the tag's identification code. Likewise m and z represent a general number of bits. An embodiment, described in a later section, is implemented so that m=3 and z=8, however the present invention is not limited thereby. Also, z bits can include m bits as described in the examples that follow but this is not a limitation on the present invention. In another embodiment, the z bits, modulated and sent to the reader can follow the m bits used to select the response bin.

In one embodiment of the invention, a tag may be fabricated through a fluidic self-assembly process. For example, an integrated circuit may be fabricated with a plurality of other integrated circuits in a semiconductor wafer. The integrated circuit will include, if possible, all the necessary logic of a particular RF tag, excluding the antenna 31 (FIG. 2A). Thus, all the logic shown in the tag 30 (FIG. 2A) would be included on a single integrated circuit and fabricated with similar integrated circuits on a single semiconductor wafer. Each circuit would be programmed with a unique identification code and then the wafer would be processed to remove each integrated circuit from the wafer to create blocks, which are suspended in a fluid. The fluid is then dispersed over a substrate, such as a flexible substrate, to create separate RF tags. Receptor regions in the substrate would receive at least one integrated circuit, which then can be connected with an antenna on the substrate to form an RF tag. An example of fluidic self-assembly is described in U.S. Pat. No. 5,545,291. In other embodiments, the identification code and other data may be programmed into the integrated circuits after being packaged into the RF tag via RF energy or direct contact with the integrated circuit.

Figure 3:
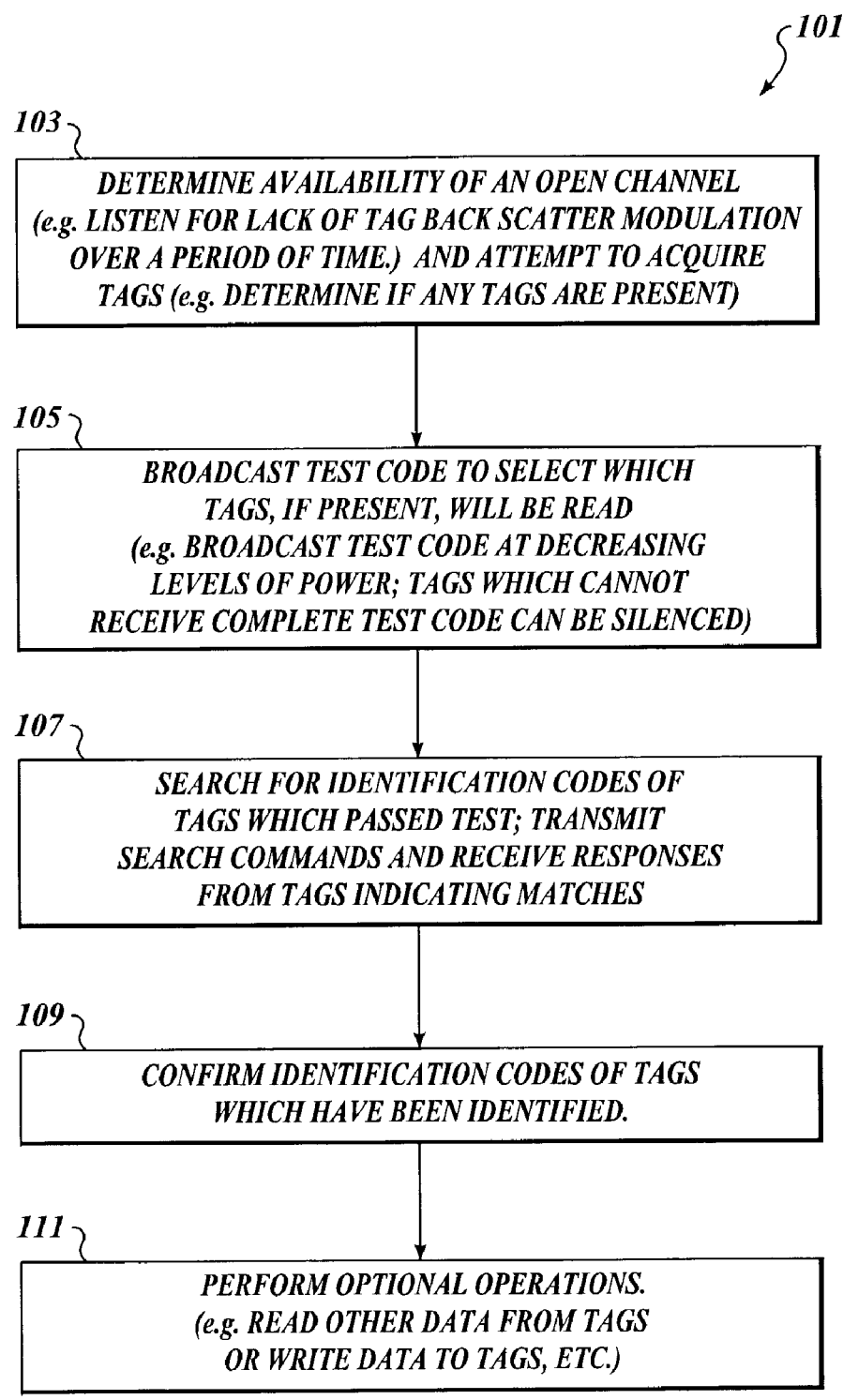
FIG. 3 is a flowchart representing an exemplary method of a reader according to the present invention.

FIG. 3 shows one example of a method according to the invention for operating a reader. Method 101 may begin in operation 103 in which the reader determines the availability of an open channel. In one embodiment, the reader would listen for the lack of tag backscatter modulation over a period of time, and if there is no such backscatter modulation, then the channel is available. In another embodiment, the reader can listen for the lack of transmitted signals from other readers to determine if the channel is available. At this point, the reader would attempt to acquire any tags. For example, it may broadcast a signal to determine whether any tags are present. If no tags are present, the reader may become quiescent and resume operation 103 at some point in time later. On the other hand, if tags are present, then in operation 105 the reader may perform an optional test to select which tags, if present, will be read. The reader, for example, may broadcast a test code at one or more levels of power, and tags, which cannot successfully receive a complete and valid test code, can be silenced as a result of this test. Tags, which are not silenced as a result of the optional test code, can then be searched in operation 107.

Alternatively, other methods of validating the integrity of the communication link between reader and tag can be utilized, either separately or in conjunction with the test code method described previously. For example, the reader may include error-checking information in its transmission to the tag or tags, such as parity bits or cyclic redundancy check (CRC) bits. In such cases, the tag will evaluate the integrity of the error-checking information to determine whether to enable subsequent responses. Therefore, tags that are unable to successfully pass such error-checking test(s) will not corrupt valid responses from other tags.

Typically, the tag identity is searched by receiving commands, which are search commands, from the reader and responding in a manner prescribed by the reader to these search commands when a match does occur. The command sequence sent by the reader will typically specify a portion of tag memory to be compared to data sent by the reader. Normally, only a data match in a tag causes the tag to respond to a search command in typical embodiments of the present invention. When a data match occurs within a tag, the specific tag response is defined by the protocol and the parameters sent to the tag in the reader command sequence.

Typically, the reader will identify a unique tag through a series of reader commands and tag responses. After finding a particular identification code in a tag, the reader may optionally confirm the identification code. This confirmation may involve performing a checksum on the identification code at the reader and then transmitting the checksum to the tag and having the tag perform a similar checksum operation and confirm it arrives at the same checksum. Failure to arrive at the checksum at the tag produces an error signal which causes the tag to silence itself and not respond, causing the reader to remove the identification code of the tag from its list of identified tags. Other methods of confirming the code may alternatively be used. Operation 111 involves performing optional operations such as reading other data from the tags or writing data to the tags, etc. The identification system provided by the present invention is capable of identifying a single tag in the field of the reader. Anti-collision functionality is provided to manage reading multiple tags in the field of the reader. Errors are managed in the system from sources of RF interference and marginal tags. Compatibility can be maintained with read-write systems across tag classes.

Communication Layer

Protocol Overview

System communication follows a two-stage commandreply pattern where the reader initiates the transaction (Reader Talks First, RTF). In the first phase, the reader provides power to one or more passive or semi-passive tags with continuous wave (CW) radio frequency (RF) energy. Tags power up in an "Awake" state ready to process commands. The reader transmits information to the field of tags by amplitude modulation using the reader-to-tag encoding scheme described below. On completion of the transmission, the reader ceases modulation and maintains transmission of CW RF energy to power the tags during the reply phase. tags communicate with the reader via inductive coupling or backscatter modulation (depending on the frequency employed by the transmitter in the reader) during this period using bit encoding described below in conjunction with FIG. 15 and FIG. 16.

Basic Command Format

The "Basic Command Format" is flexible and can be used with at least the four classes of tags previously described. In one embodiment, very low cost (VLC), single-chip tags may have limited oscillator stability. Under the Basic Command Format, the reader provides a series of pulses to synchronize the tag's internal oscillator at the beginning of each transmission. Replies from the tags are structured such that the reader can interpret the information transmitted by the tags at whatever clock frequency the tag is able to provide. The readers can accommodate base modulation rate differences and monotonic drifts in modulation rates during transactions of at least eighty (80) bits.

In one embodiment, Basic Commands can be designed to limit the amount of state information the tags have to store between transactions. The power available to a passive tag is a complicated function of transmitted power, tag/reader antenna orientations, local environment and external sources of interference. Thus, tags on the margins or fringes of the RF field may be powered unreliably and therefore be unable to maintain a memory of previous transactions with the reader. Consequently, the Basic Command Format can be configured to use "atomic" transactions with the tags. That is, encased in each command is enough information for tags to respond appropriately without reference to previous transactions.

Commands can be used to "read" the tag's address or identification code. Address and identification code can be used interchangeably to refer to a unique tag, no limitation is implied by the use of one term in place of the other. The number of bits in the tag's address may be increased or decreased according to the desired implementation of the present invention. The present invention is not limited by the number of bits selected for the address of the tag. In one embodiment, a 64-bit address number can be used. In another embodiment it may be desirable to employ a 96-bit address number. The present invention is not limited thereby.

Basic Commands

In one embodiment, four Basic Commands described briefly here and in more detail below are used to read the tag's address number. In one embodiment of the present invention, described below, the address number will consist of 64 bits.

Scroll—tags matching data sent by the reader reply by sending back their entire address (LSB first) plus a sixteen (16) bit cyclic redundancy check (CRC) for error checking. Data sent by the reader may be of variable length. In an alternative embodiment, the scroll command may include an additional command (e.g. a sleep command) that is appended to the scroll command. This appended command is performed by the tag after completing the scroll operation invoked by the scroll command.

Sleep—tags matching data sent by the reader enter an inactive state where they no longer respond to reader commands. This "state" is maintained as long as the tag remains powered. Tags power up in the "Awake" state and by default, respond to the reader. Data sent by the reader may be of variable length.

Kill—Tags matching the entire 64-bit address, 16-bit CRC and a special destruct code sent by the reader are permanently deactivated and will no longer respond to reader queries. This "destruct" command renders the tag inactive forever in one embodiment. In one embodiment, the Kill command will require higher field strengths from the reader, and therefore be a short-range (e.g. 30 centimeters (cm) reader to tag distance) operation. Other embodiments may allow for longer or shorter addresses, different CRC or other error check encoding as well as different destruct codes in combination. The distance at which the destruct code may be effective is variable according to a desired range.

Ping—This command is used as part of a multi-tag anti-collision algorithm described in detail below. Tags matching data sent by the reader respond in one of n time bins delineated by clock ticks sent from the reader. The m least significant bits (LSBs) of the tag's address starting at a point designated by the reader determine the response bin. In one embodiment, the response itself transmits eight bits of information in one of the n time bins. Other embodiments can be used to change the number of time bins and/or the number or position of the bits that determine the time bin that the tag will respond in. In other embodiments, the number of bits of the tag's identification code transmitted in the response can change. The example described herein, where eight bits of information are sent by the tag in the response is given for illustration only, no limitation is implied thereby.

The duration of the clock ticks created by the reader that delineate the n time bins can be small or large depending on a particular implementation of the invention. In general, the clock tick must be long enough to accommodate the settling time of the receiver or drift of the tag's oscillator.

Figure 4:
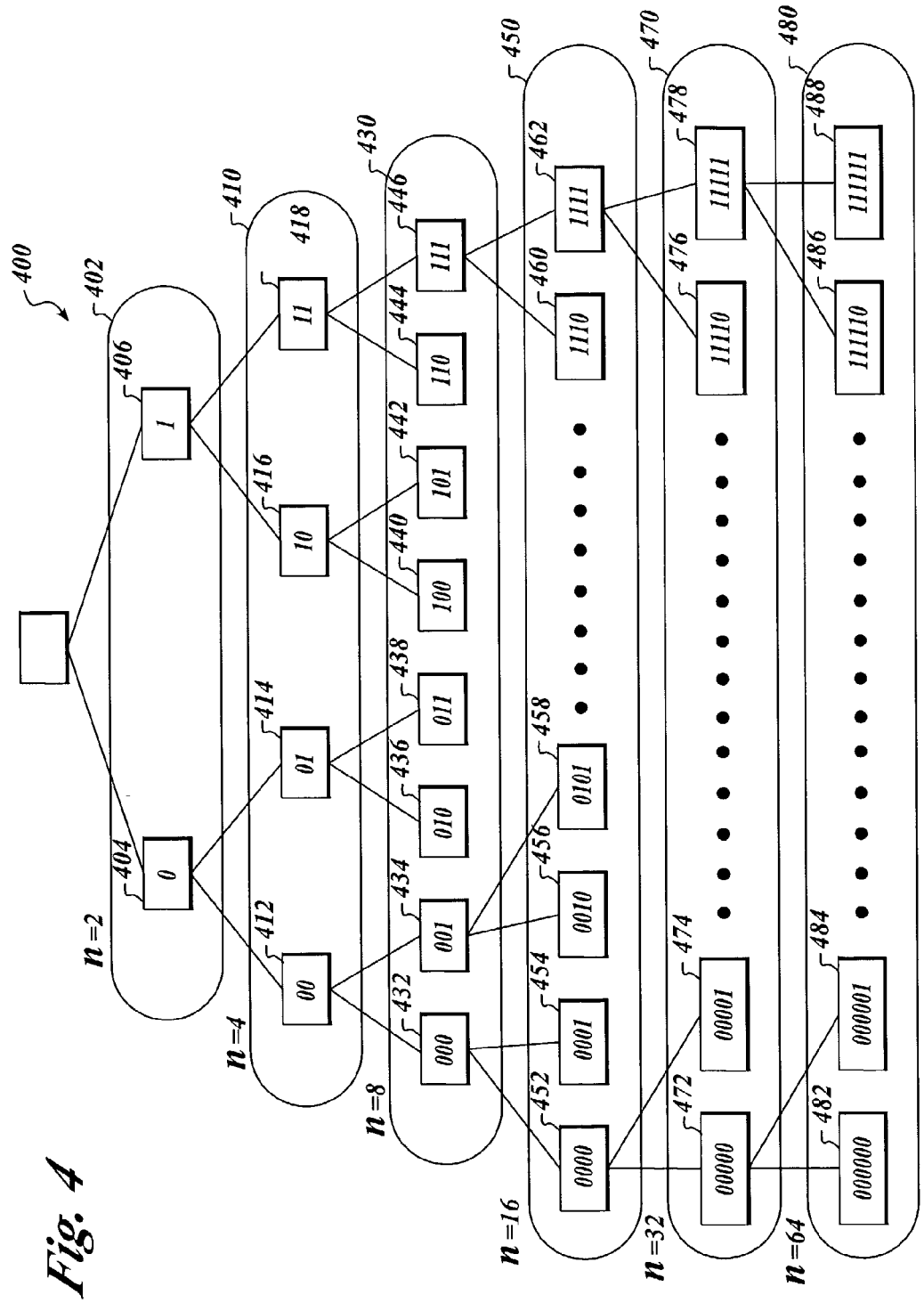
FIG. 4 illustrates dividing a tag population's response into n bins.

The Ping command can be used in a flexible way according to different embodiments of the present invention. FIG. 4 illustrates one relationship between n time bins and m least significant bits of the tag's address. With reference to FIG. 4, the binary tree 400 contains a row 402 containing two bins 404 and 406. Within the bin 404 is a value m=0 representing the least significant bit (LSB) of the tags that will respond in a time bin corresponding to bin 404. Similarly, a value m=1 represents the LSB of the tags that will respond in a time bin corresponding to bin 406.

A second row 410 contains four time bins 412, 414, 416, and 418, which contain the two (2) LSBs of the tags' addresses that will respond in time bins corresponding to 412, 414, 416, and 418 respectively. A third row 30 contains eight bins 432, 434, 436, 438, 440, 442, 444, and 446 which contain the three (3) LSBs of the tags' addresses that will respond in time bins corresponding thereby. As the rows increase to 450, 470, and 480 the number of bins grows to n=16, n=32, and n=64 respectively and the maximum number of known LSBs in the tags' addresses increase. The result is that a smaller number of tags respond in a bin as the row number n increases.

Programming Commands

Commands used to program information into the tags at manufacture follow the Basic Command Format. In one embodiment, four Programming Commands, described below, are used to program the tags.

Erase—The Erase Command sets all bits of the tag to the value "0". This command is a bulk erase of the entire memory array. In general, the erase operation is executed prior to the program command to initially clear memory. The Erase Command may not be executed on tags that have been LOCKED (refer to Lock Command).

Program—The Program Command is accompanied with memory address information and the data that is to be programmed into the tag. For efficiency in time, multiple bits (e.g. 16) will typically be programmed simultaneously. Various memory architectures may dictate the length of data to be programmed for optimum efficiency. The programming cycle may be preceded by an ERASE cycle to ensure that all data is programmed to the correct states. Programming is only allowed if the tag has not been previously locked.

Verify—The verify command is used to examine the contents of memory as part of a programming cycle in order to allow the programming device to verify that all tag memory has been correctly programmed. The verify command may be executed after a program or erase command. The command will address all bits of the memory and transmit the contents to the programmer. The Verify command may not be executed on tags that have been LOCKED.

Lock—The Lock command, once executed, disables future use of the erase, program and verify commands, and is typically executed following successful programming of tag memory. All programming commands are made inoperative by the execution of the LOCK command.

TABLE 1

Basic Command Field Descriptions.

| Basic Command Field | Number of Bits | Field Description |
|---|---|---|
| [SPINUP] | 20 | Every Basic Command is prefixed by a series of logical zeros (0) for tag timing. The synchronization circuitry on the tag uses this part of the message to establish its onboard timing for reading/decoding messages and clocking subsequent replies to the reader. |
| [SOF] | 1 | Start of Frame indicator. A logical one (1) |
| [CMD] | 8 | 8-bit field that specifies the command being sent to the tags. (See Command Data table below.) 8 bits yields up to 256 commands. Four of these are used for type I tags and the remaining address space is reserved for more advanced, Class II and higher tags. |
| $[P_1]$ | 1 | Odd Parity of the [CMD] field data. |
| [PTR] | 7 | 7-bits - Pointer to a location in the tag address. Value starts at the LSB and works up. [PTR] is the starting point for tags to attempt a match with data specified in the [VALUE] field. |
| $[P_2]$ | 1 | Odd Parity of the [PTR] field data. |
| [LEN] | 7 | 7-bits - Equal to the length of the data being sent in the [VALUE] field. |
| $[P_3]$ | 1 | Odd Parity of the [LEN] field data. |
| [VALUE] | Variable (1–96) | 1 to 96 bits of data for Class I tags. Under Ping, Scroll, Sleep, or Kill commands, this is the data that the tag will attempt to match to its own address. (LSB first.) |
| $[P_4]$ | 1 | Odd Parity of the [VALUE] field data. |
| $[P_5]$ | 1 | Odd Parity of all of the Parity fields. |
| [EOF] | 1 | End of Frame indicator. A logical one (1). |

Reader Command Structure—(Reader to Tag Communication)

The format of a Basic Command from the reader to the tag is composed of seven (7) fields and five (5) pieces of parity information. The Basic Command Structure is shown in FIG. 5. With reference to FIG. 5, the Basic Command fields, for one embodiment, are listed and defined above in Table 1. Other embodiments may vary the length and encoding of the fields and or parity types, to achieve data sizes or add additional commands.

The bit patterns for the Basic Commands are listed in Table 2 for one embodiment of the present invention. Replied from the tags in response to the Basic Commands are also shown in Table 2.

TABLE 2

Basic Command Bit Patterns and tag Reply.

| Basic Commands [CMD] | 8-Bit Pattern MSB <- LSB | Reply from tag (See Response Interval below) |
|---|---|---|
| SCROLL | 0000 0001 | "Scroll Reply" |
| SLEEP | 0000 0010 | None |
| KILL | 0000 0100 | None |
| PING | 0000 1000 | "Ping Reply" |
| High Nibble (Four (4) bits) reserved for programming and Class III–IV commands | ****____ | |

TABLE 3

Programming Command Bit Patterns.

| Programming Commands [CMD] | 8-Bit Pattern MSB <- LSB | Comment |
|---|---|---|
| PROGRAM | 0011 0001 | |
| ERASE | 0011 0010 | |
| LOCK | 0011 0100 | |
| VERIFY | 0011 1000 | |

Response Interval (Tag to Reader Communication)

In one embodiment, Scroll and Ping commands are the only Basic Commands that result in a response from tags. Under these commands, tags respond if the data sent by the reader in the [VALUE] field matches the tag's internal address starting at the location specified by the [PTR] field and all parity fields evaluate correctly. Data is compared, starting from the least significant bit (LSB) and moving up in bit significance. Tags that match will reply in one of two ways: (1) a "Scroll Reply"; or (2) a "Ping Reply". Tags that fail the match do not modulate. While the criteria for whether a tag responds to a command is the same for Scroll and Ping commands, the response pattern issued from the tag is not. These differences are outlined below. Other embodiments may be used to change the order of the bits programmed into the tag memory and thereby change the order of search from LSB to most significant bit (MSB) and from MSB to LSB. Many data representations are possible within the teaching of the present invention.

Scroll Reply

Figure 6:
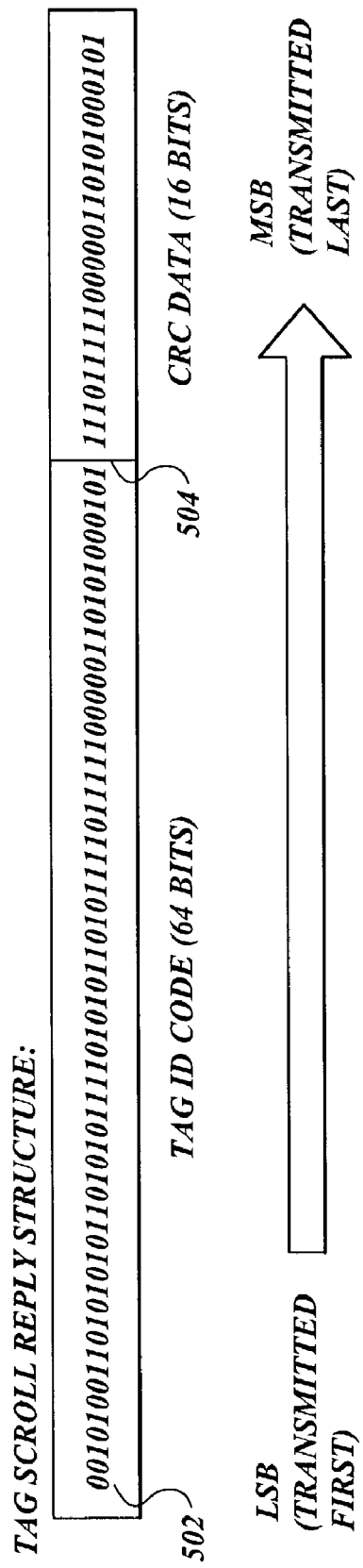
FIG. 6 illustrates a Scroll reply from a tag (80 bits in total).

Tags that respond to a Scroll command reply by transmitting to the reader their entire 64-bit address and a 16-bit CRC for a total of eighty (80) bits, using the modulation method described below in conjunction with FIGS. 15 and 16. In one embodiment, tags start by modulating from the LSB up through the MSB as illustrated in FIG. 6 where a bit 502 corresponds to the LSB of the tag address and a bit 504 corresponds to the MSB of the tag address.

A Scroll command may be illustrated by the following example using three tags in view of the reader. If the reader issues a command with the following data:

[CMD]=00000001 (Scroll);
[PTR]=0000111 (7);
[LEN]=0001001 (9);
[VALUE]=000101101.

Tags would attempt to match nine (9) bits of their address data, starting at position seven (7) against the data specified in the value field, starting at the LSB and working up in bit significance.

In Table 4 below, tags 1 and 3 will respond to the Scroll command but tag 2 will not.

TABLE 4

Scroll Command Example.

| | tag ID Code/Bit Position | | tag will Respond to |
|---|---|---|---|
| | MSB | LSB | Scroll Command |
| Bit Position | ...3210987654 | 3210987654321 | — |
| tag 1 | ...0100010000 | 0101101110101 | YES |
| tag 2 | ...1001110000 | 0100101001001 | NO (bit 10 does not match) |
| tag 3 | ...1011010100 | 0101101111011 | YES |

Ping Reply

The Ping command is used extensively in the anti-collision algorithm described below. In one embodiment, the example from FIG. 4 corresponding to row 430 will be described where n=8 and m=3. In this embodiment, the Ping command requires that tags reply by modulating eight (8) bits of data, encoded into Bit Cells, in one of eight (8) time bins delineated by modulations (or "Ticks") from the reader. The bin that a particular tag responds in is determined by the three LSBs of the tag's address immediately following the portion of its address indicated by the [PTR], [LEN], and [VALUE] fields specified in the Ping Command. Tags with LSBs of '000,' (702 in FIG. 7) respond in the first bin, tags with LSBs of '001' reply in the second bin so on out to tags with LSBs of '111' responding in the eighth bin (716 in FIG. 7).

Figure 7:
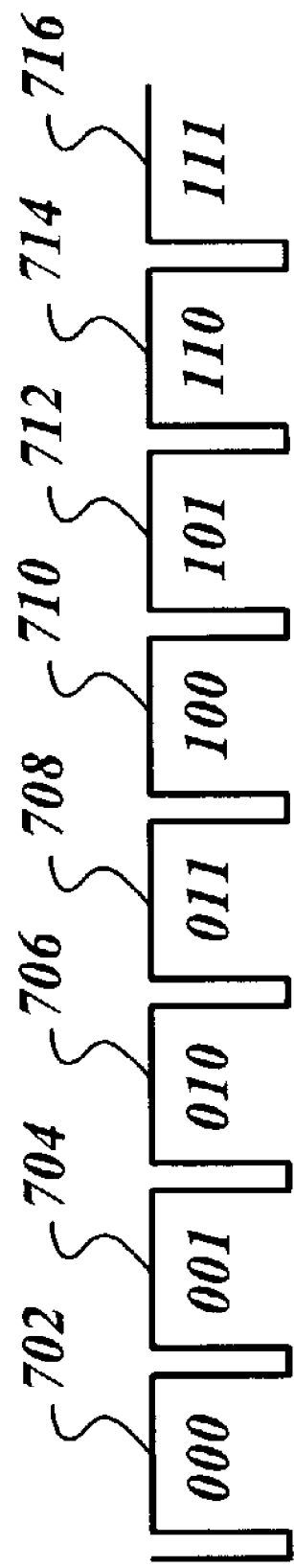
FIG. 7 illustrates a Ping Reply response period, reader modulations define response bins.

The eight (8) time bins are illustrated in FIG. 7 by 702 through 716. The chronological order of bins 702 through 716 may be arranged in any sequence. The sequence shown in FIG. 7 is one example of an embodiment according to the present invention. The present invention is not limited by the order or number of the bins so arranged. It is also noted that the number of bits in two or more bins could be different.

An example of a Ping command may be illustrated with the following values for the Command Fields. If the reader issues a command with the following data:

[CMD]=00001000 (Ping);

[PTR]=0000111 (7);

[LEN]=0001001 (9);

[VALUE]=000101101.

Tags receiving the command will attempt to match nine (9) bits of their address data, starting at position seven (7), against the data specified in the value field, starting at the LSB and working up to the MSB. Those tags obtaining a match will respond in one of eight bins determined by the three LSBs immediately following the matched portion of their address data.

Figure 8:
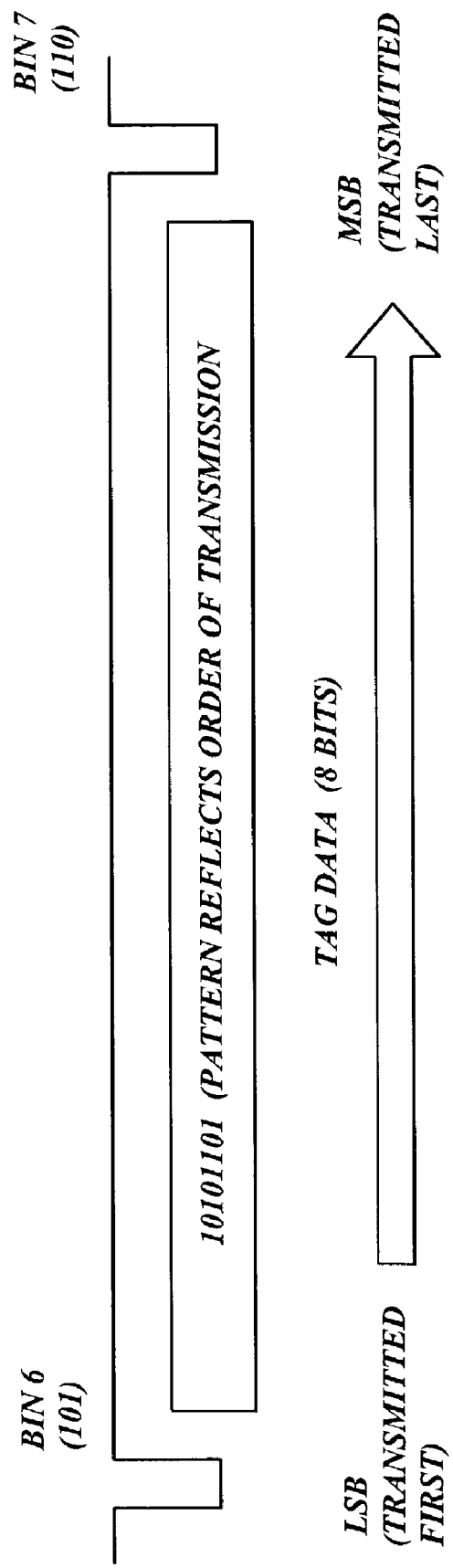
FIG. 8 illustrates a tag Ping Reply for tag 3 (Table 5).

In Table 5 below, three tags will respond to the Ping Command in three different bins as determined by the three (3) LSBs of the tags' addresses. In Table 5, underlined bits are compared and italicised bits are sent to the reader. Thus, tag 1 responds in Bin 5 (LSB=100) corresponding to 710 in FIG. 7; tag 3 responds in Bin 6 (LSB=101) corresponding to 712 in FIG. 7; and tag 4 responds in Bin 1 (LSB=000) corresponding to 702 in FIG. 7. Tag 2 does not respond because bit 10 of the tag address (0) does not match the corresponding bit in [VALUE] (1). The order of transmission from the tag is as shown in FIG. 8 from the least significant bit to the most significant bit.

TABLE 5

Ping Command Response Example.

| tag ID Code/Bit Position | | tag will Respond to Ping Command | Bin for Response | 8-bit Response MSB LSB |
|---|---|---|---|---|
| MSB | LSB | | | |
| Bit Position | ...32109876543210987654321 | — | — | — |
| tag 1 | ...*01000100*000101101110101 | YES | Bin 5 (100) | 01000100 |

TABLE 5-continued

Ping Command Response Example.

| tag ID Code/Bit Position | | tag will Respond to Ping Command | Bin for Response | 8-bit Response MSB LSB |
|---|---|---|---|---|
| MSB | LSB | | | |
| tag 2 | ...10011110000100101001001 | NO (bit 10 does not match) | — | — |
| tag 3 | ...*10110101*000101101111011 | YES | Bin 6 (101) | 10110101 |
| tag 4 | ...*10110000*000101101111011 | YES | Bin 1 (000) | 10110000 |

In alternative embodiments, the tags can respond to a Ping command by modulating tone signals rather than modulating data on a single frequency. For example, each tag may have a unique tone. Thus, in response to a Ping command, a tag may transmit its tone, which will, in effect, announce the presence of that tag. In other embodiment, one tone may be used for indicating a "1" while another tone may be used to indicate a "0". Thus, a tag can respond to a Ping command in the appropriate bin by modulating the two tones to indicate the next bits of its address. In yet other embodiments, a tag can use multiple tones can be used to encode multiple next bits of its address. This approach allows the reader to readily detect the Ping command responses because the tones are outside the channels used by reader-to-tag communication. In one embodiment, the reader can include a digital signal processing (DSP) chip that is configured to detect the tone signals.

Anti-Collision Algorithm

In the embodiment under discussion, the Ping Command divides a population of tags into eight sub-populations based on their addresses by binning tag responses into eight separate time slices. This binning is used in an anti-collision algorithm that probes a number space or a binary address tree a maximum of m bits at a time. Individual tags can be isolated from large populations in the field of the reader by issuing multiple Ping commands to the field, analysing the responses and eventually issuing the appropriate Scroll Command.

Figure 9:
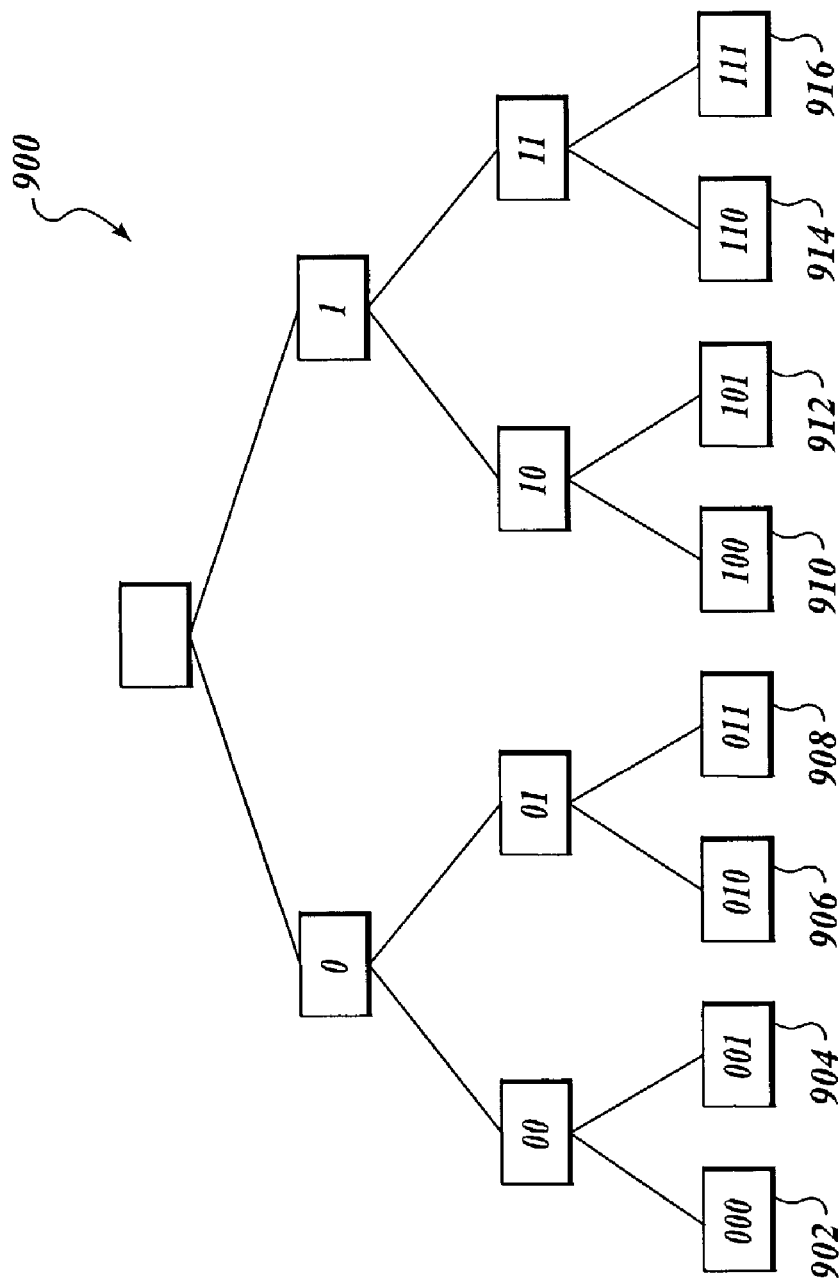
FIG. 9 shows the first three least significant bits (LSBs) represented as a binary tree.

In one embodiment of an anti-collision algorithm, m=3. FIG. 9 illustrates the first three LSBs of tag address space represented as a binary tree at 900. The tree shown continues through the entire 64-bit tag identification code, but only the first three levels are shown.

A Ping command with [PTR]=0, [LEN]=0 and [VALUE]=0 probes from the top of this tree down through the first three bits (for an architecture using m=3). Tags with LSBs of 000 respond in bin 1 at 902, tags with LSBs of 001 respond in bin 2 at 904, out to bin 8 where tags of LSBs 111 respond at 916. Readers can look for backscatter modulation from the tags in each of these bins and learn about the tag population even if collisions make reading the eight (8) bits of data sent by the tags difficult. Merely the presence of backscatter in a given bin is an indication that one or more tags match the query. The bin number tells the reader what the next three MSBs of tag address are.

Anti-Collision Example

The following non-limiting example illustrates separation of two tag responses into different bins with a Ping Command. The two tags have addresses with LSBs of 011 and 101.

Query 1:
   [CMD]=00001000 (Ping);
   [PTR]=0000000;
   [LEN]=0000000;
   [VALUE]=0.

Figure 10:
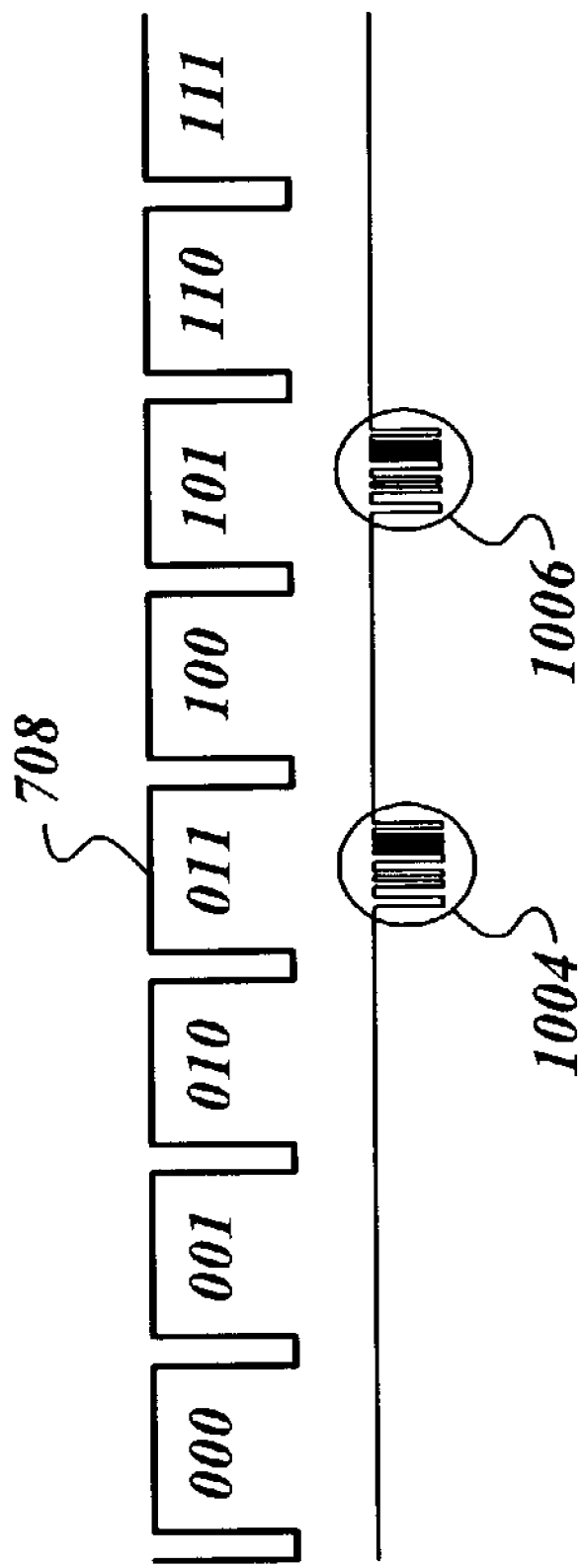
FIG. 10 shows backscatter modulation during replay interval from example Ping (Query 1).

With respect to FIG. 10, during the Reply, backscatter modulation is observed in bins four (4) (FIG. 10 at 1004) and six (6) (FIG. 10 at 1006). Because multiple tags are modulating in each of these bins, contention is observed but the reader now knows there are tags present, and that there are two distinct populations with the first three LSBs of 011 and 101, respectively. Using this information, the reader may issue a second Ping Command (QUERY 2) to explore the population of tags in bin four (4), reserving the tags seen in bin six (6) for later analysis.

Query 2:
   [CMD]=00001000 (Ping);
   [PTR]=0000000;
   [LEN]=0000011 (3);
   [VALUE]=011.

Figure 11:
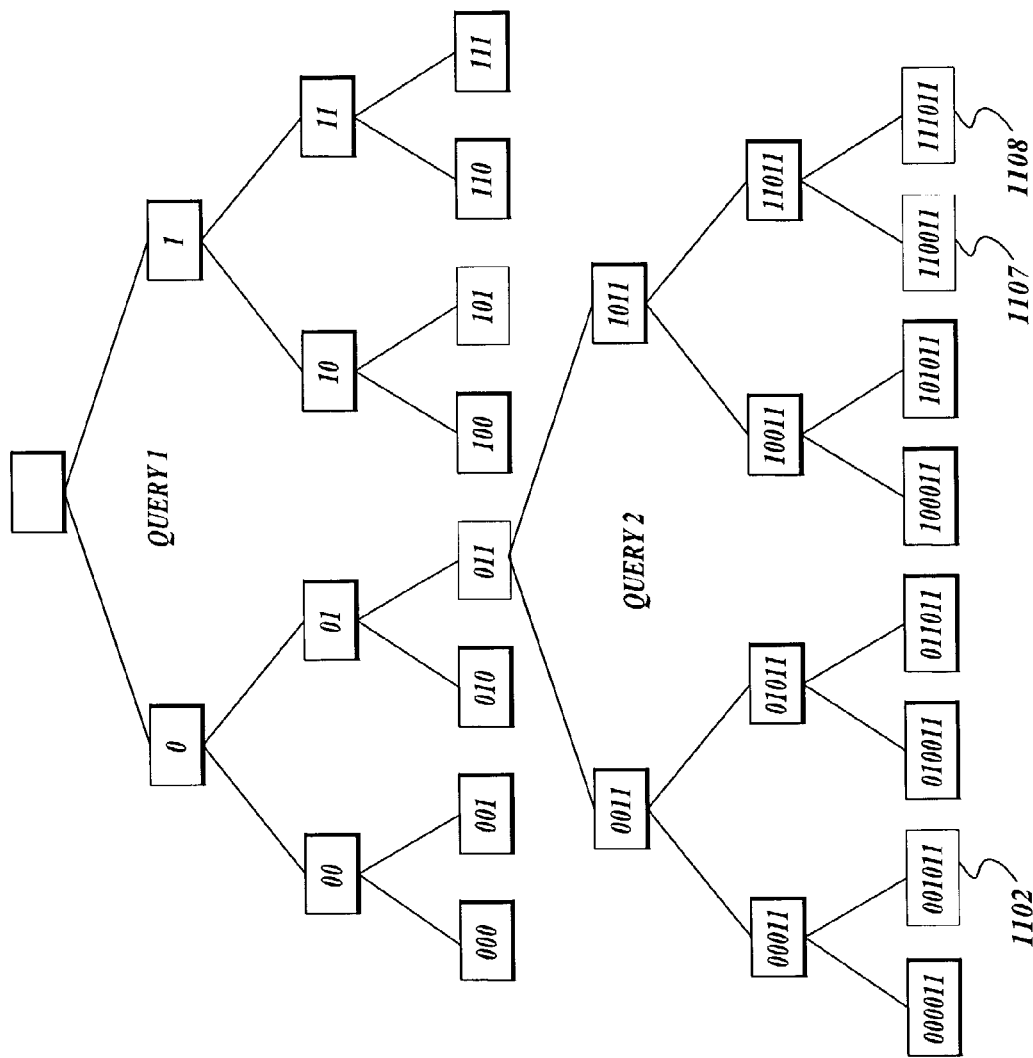
FIG. 11 shows query tree for two Ping commands.

The effect of this command is to explore three (3) bits farther into the tree from the 011 position as shown in FIG. 11.

Figure 12:
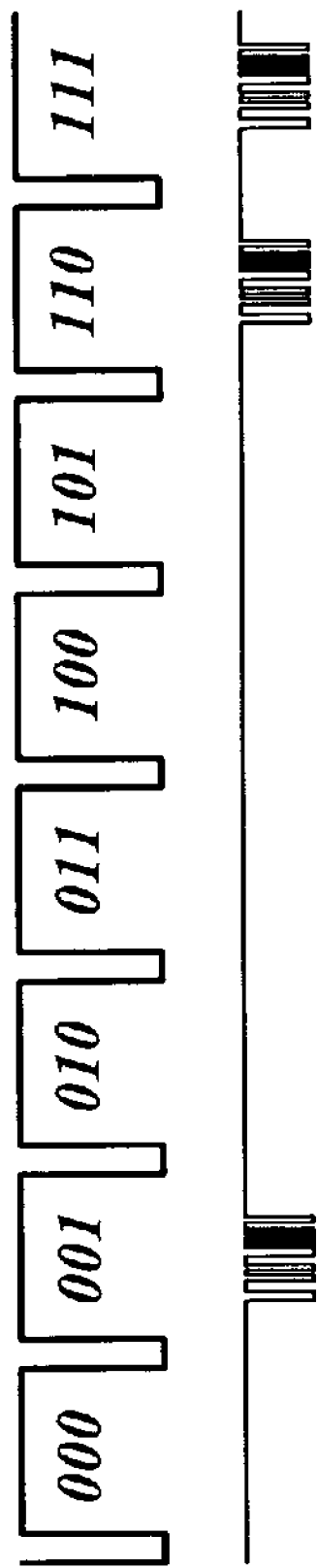
FIG. 12 shows backscatter modulation during reply interval from example Ping (Query 2).

With reference to FIG. 11, the branches highlighted contain groups of tags that match QUERY 2. These are the same tags that were responding to the first query in bin four (4). In this new query, tag modulation during the reply interval would show up in bins two (2), seven (7), and eight (8) (bins 1102, 1107, and 1108 in FIG. 12). The reader now knows six bits of address information for these tags as well as three bits of address information for the tags on the branch not pursued in QUERY 1. The reader may continue iteratively, and use the Ping Command to follow a branch through the tag address space until it explores the entire 64-bit address and 16-bit CRC of the tag.

The "divide by eight" feature of the Ping Command allows quick reduction of the number of tags replying in each bin. Simulations of 100-tag populations show that with random addresses, fewer than four Ping Commands, on average, are needed to isolate a single tag. If only a single tag replies in a given bin the reader can decode the eight (8) bits of information being sent from the tag and issue a Scroll command to that tag using the [PTR] [LEN] and [VALUE] data that successfully isolated the tag.

In one embodiment of the present invention, each transaction with the tag population is a self-contained operation. A command—response pair is an atomic transaction requiring no knowledge of what has happened in the past for the tag to participate. This "memory-less" feature can greatly enhance the performance of passive tags' in noisy environments or at marginal RF power levels. The reader maintains information about the progress through the binary tree that represents the tag's identification codes. Branches that show a tag signal, but are not immediately explored may be held in memory and later examined to improve overall throughput. Readers with widely varying capabilities can make use of the same protocol.

A sophisticated reader that can perform contention detection within a bin can perform very rapid sorts of groups of tags. Tags can be quickly isolated using a series of Ping Commands and then read using the Scroll Command. Simple readers without the ability to detect contention (for example, a reader with only an analogue filter to look for "tag-like" modulation) can still sort and identify tags using only the Ping Command.

The Commands previously described can be used to identify tag addresses in different scenarios. Below are a number of examples of how these commands can be used.

Scenario 1—Single Tag Expected in a Field

In this example, the nature of the application ensures only single tags will be present in the field of the reader. This is a fairly common application and would be found at a tollbooth, at a chute in a stockyard, on a conveyor belt, etc. Anti-collision functionality is not necessary and the reader may simply repeatedly issue a Scroll command with [PTR]=0, [LEN]=0 and [VALUE]=0 to cause any tags in the area to issue their address and CRC to the reader. This is a special case of the Scroll command in which no comparison is made between the bit transmitted to the tag in the [VAL] field. Where the [LEN] field is non-zero the bit(s) included in the [VAL] field must match the tag values in order for the tag to respond, as previously described.

Command 1: Scroll, [PTR]=0, [LEN]=0, [VALUE]=0

Reply 1: [64-bit tag ID code]+[16-Bit CRC]

Scenario 2—Multiple Tags, Random Addresses

In this non-limiting example, a population of four (4) tags is presented to the reader. The tag ID codes of these tags are shown in FIG. 6 Ping Commands are used to isolate the tags. Scroll Commands are used to read and verify the tags' addresses. The Command is issued by the reader:

Command 1: Ping, [PTR]=0, [LEN]=0, [VALUE]=0.

In response, each tag sends the italicised bits (of table 6) to the reader. Table 7 illustrates the bins in which the tags transmit their responses. In Table 7 the reader notes isolated tags in Bin 1 and Bin 6, contention is noted in Bin 4 where multiple tags (tag 3 and tag 4) respond in the same bin.

TABLE 6 tag addresses.

| | tag ID Code/Bit Position | |
|---|---|---|
| | MSB | LSB |
| Bit Position | ...32109876543210987654321 | |
| tag 1 | ...010001000001011 0*1110101* | |
| tag 2 | ...100111000010010*1001000* | |
| tag 3 | ...101101010001001 0*1111011* | |
| tag 4 | ...101100001110101*01101011* | |

TABLE 7

Tag signals as read by the reader.

Reply 1:

| Reply Bin | 1 | 2 | 3 | 4 | 5 | 6 | 7 | 8 |
|---|---|---|---|---|---|---|---|---|
| Bin Value | 000 | 001 | 010 | 011 | 100 | 101 | 110 | 111 |
| Contention Observed | NO | — | — | YES | — | NO | — | — |
| tag 1 Response | | | | | | | 01110101 | |
| tag 2 Response | 01001000 | | | | | | | |
| tag 3 Response | | | | 01111011 | | | | |
| tag 4 Response | | | | 01101011 | | | | |

The second command is issued by the reader:
Command 2: Scroll, [PTR]=0, [LEN]=3, [VALUE]=000.
Reply 2: tag 2 matches Scroll criteria. Tag 2 sends [64-bit tag ID code]+[16-Bit CRC] to be received by the reader.
The third command is issued by the reader:
Command 3: Scroll, [PTR]=0, [LEN]=3, [VALUE]=101.
Reply 3: tag 1 matches Scroll criteria. Tag 1 sends [64-bit tag ID code]+[16-Bit CRC] to be received by the reader.
The fourth command is issued by the reader:
Command 4: Ping, [PTR]=O, [LEN]=3, [VALUE]=011.

Underlined bits are compared. Italicised bits are sent to the reader as shown in Table 8 below. The contention is now resolved and the reader has located isolated tags in bins 6 and 8, as shown in Table 9.

TABLE 8 tag 3 and tag 4 address data is transmitted.

| | Tag ID Code/Bit Position | |
|---|---|---|
| | MSB | LSB |
| Bit Position | ...32109876543210987654321 | |
| tag 1 | ...01000100000101101110<u>101</u> | |
| tag 2 | ...10011100001001010010<u>00</u> | |
| tag 3 | ...1011010100010010<u>1111</u>011 | |
| tag 4 | ...101100000110<u>1101101</u>011 | |

Scroll Commands are now issued by the reader to obtain the complete address for tag 3 and tag 4.
Command 5: Scroll, [PTR]=0, [LEN]=6, [VALUE]= 101011.
Reply 5: tag 4 matches Scroll criteria. Tag 4 sends [64-bit tag ID code]+[16-Bit CRC] to be received by the reader.
Command 6: Scroll, [PTR]=0, [LEN]=6, [VALUE]=111011.
Reply 6: tag 3 matches Scroll criteria. Tag 3 sends [64-bit tag ID code]+[16-Bit CRC] to be received by the reader.

The Anti-collision algorithm is now complete with all tags are identified. It will be noted that other embodiments may be employed to fulfill various applications, data processing and sorting methods, tag programming sequences, tag detection geometries, and various reader implementations by use of the Basic Commands provided by the protocol taught within the present invention. The present invention is not limited thereby.

RF Transport Layer

The present invention can be employed over a broad spectrum of frequency. In one embodiment, considered in this section, the RF Transport Layer is described with parameters specified for ultra high frequency (UHF) operation. However, those of skill in the art will appreciate that the present invention is not limited to the UHF spectrum.

RF Power Management

Reader radio frequency (RF) Power Management should be consistent with local regulations. The unlicensed ultra

TABLE 9

Reader Notes Isolated tags in Bin 6 and Bin 8.

Reply 4:

| Reply Bin | 1 | 2 | 3 | 4 | 5 | 6 | 7 | 8 |
|---|---|---|---|---|---|---|---|---|
| Bin Value | 000 | 001 | 010 | 011 | 100 | 101 | 110 | 111 |
| Contention Observed | — | — | — | — | — | NO | — | NO |
| tag 1 Response | | | | | | | | |
| tag 2 Response | | | | | | | | |
| tag 3 Response | | | | | | | | 00101111 |
| tag 4 Response | | | | | | 01101101 | | | high frequency (UHF) band in the United States requires readers to maintain RF emissions consistent with Federal Communications Commission (FCC) part 15.247 limits and Electromagnetic Exposure (EME) limits. Under these regulations, reader output power shall not exceed 1 Watt as measured at the antenna input. Also, reader transmitting antenna gain shall not exceed 6 decibels (dB) reference to a zero dB gain of a free-space isotropic radiator (dBi) as measured with a linear antenna. Reader RF output power may be varied in a controlled manner to:

- vary the reader's field of view;
- improve adaptability to varied applications, installations & conditions;
- conserve power consumption (i.e., battery-powered systems, etc.);
- manage reading of tags in RF field space common to multiple readers (i.e., channel control, frequency hopping, etc.); and/or
- if useful, test downlink and uplink fidelity to one or more tags.

Half-Duplex Operation

In this embodiment, the tag-to-reader and reader-to-tag link is defined as half-duplex. No tag-to-reader data link is available unless the reader is transmitting, however during this portion of the link the reader is only providing power to the tag, not sending data. During the reader-to-tag link the tag cannot transmit data.

Frequency

In one embodiment, the RF transport layer in North American utilizes the 902–928 MHz (UHF) band. Other embodiments of the present invention can utilize 13.56 MHz, 2450 MHz, and other frequency bands. Each specific frequency band and country may have specific differences in bandwidth, power, modulation, and regulatory certification. In light of the present disclosure, it will be noted by those of skill in the art, that the present invention is not limited by the frequency utilized for the RF transport layer.

In one embodiment, utilizing the UHF band near 915 MHz provides the following system performance. For operation in the United States, a high speed, e.g. 64,000 bits per second (i.e., 64 kbps) reader-to-tag system data rate may be obtained. A 128 kbps or faster tag-to-reader system data rate is possible providing consistent operation with high "hit rates" at ranges of 1 meter or more. Thus, the "uplink" data rate from the tag to the reader is faster (e.g. about 2 times and perhaps more than 4 times in certain cases) than the "downlink" from the reader to the tag. It is desirable to set the response rate (data uplink rate) from the tags at a non-harmonic rate relative to the downlink data rate. Relatively small tag and reader antennas are required. Because of lower Q requirements, inexpensive, printable antennas may be manufactured by techniques well known in the art. Human exposure to 915 MHz signals is already common and accepted in the United States. The United States band is wide enough to permit significant frequency hopping within the band.

In one embodiment for UHF operation in North America readers operate as frequency hopping systems in the 902 to 928 MHz band. Systems shall have a minimum of 50 hopping frequencies. Hopping frequencies shall be accessed in a pseudo-random manner consistent with FCC part 15.247. The time on any one frequency channel shall not be greater than 400 milliseconds (ms) in a 10 second period. The maximum allowable 20 dB bandwidth of the occupied frequency channel shall be 500,000 cycles per second (i.e., 500 kHz).

In another embodiment, for UHF operation in regions other than North America, readers may be modified to optimize performance consistent with the local regulatory environment. In an embodiment for the European market, the tags (but not necessarily the USA readers) are expected to operate in the 868 MHz band that is available there or other frequency bands that may become available.

Reader-To-Tag Modulation

Figure 13:
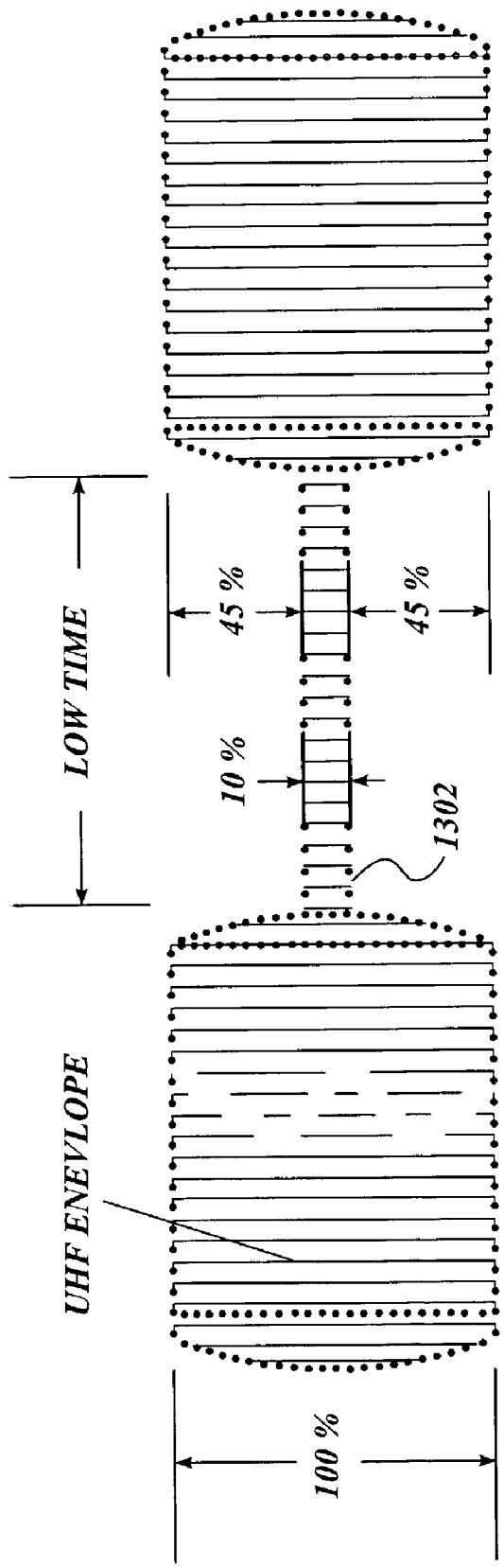
FIG. 13 shows reader-to-tag modulation.

In one embodiment, readers are in one of three available states: (1) OFF, (emitting no RF energy); (2) CW (emitting RF energy at some power level without amplitude modulation); and (3) Active (emitting RF energy with amplitude modulation). In the Active state, readers use amplitude modulation (AM) to transmit data to the tag population. In one embodiment the reader to tag link is OOK, (On-Off Keying) with a minimum of 90% modulation depth (FIG. 13). Modulation rise & fall times will be typically 300 nanoseconds (ns) limited by sideband emissions. Modulation rates are variable and data rates will depend on the local regulatory environment. An embodiment suitable for operation in the United States can employ a nominal maximum modulation rate of 64 kHz. Accordingly, in this embodiment the tag population will tolerate and respond proportionately to reader modulation rates in the range 16 kHz to 64 kHz. This embodiment is described below in conjunction with FIG. 13 through FIG. 16.

Encoding

Figure 14:
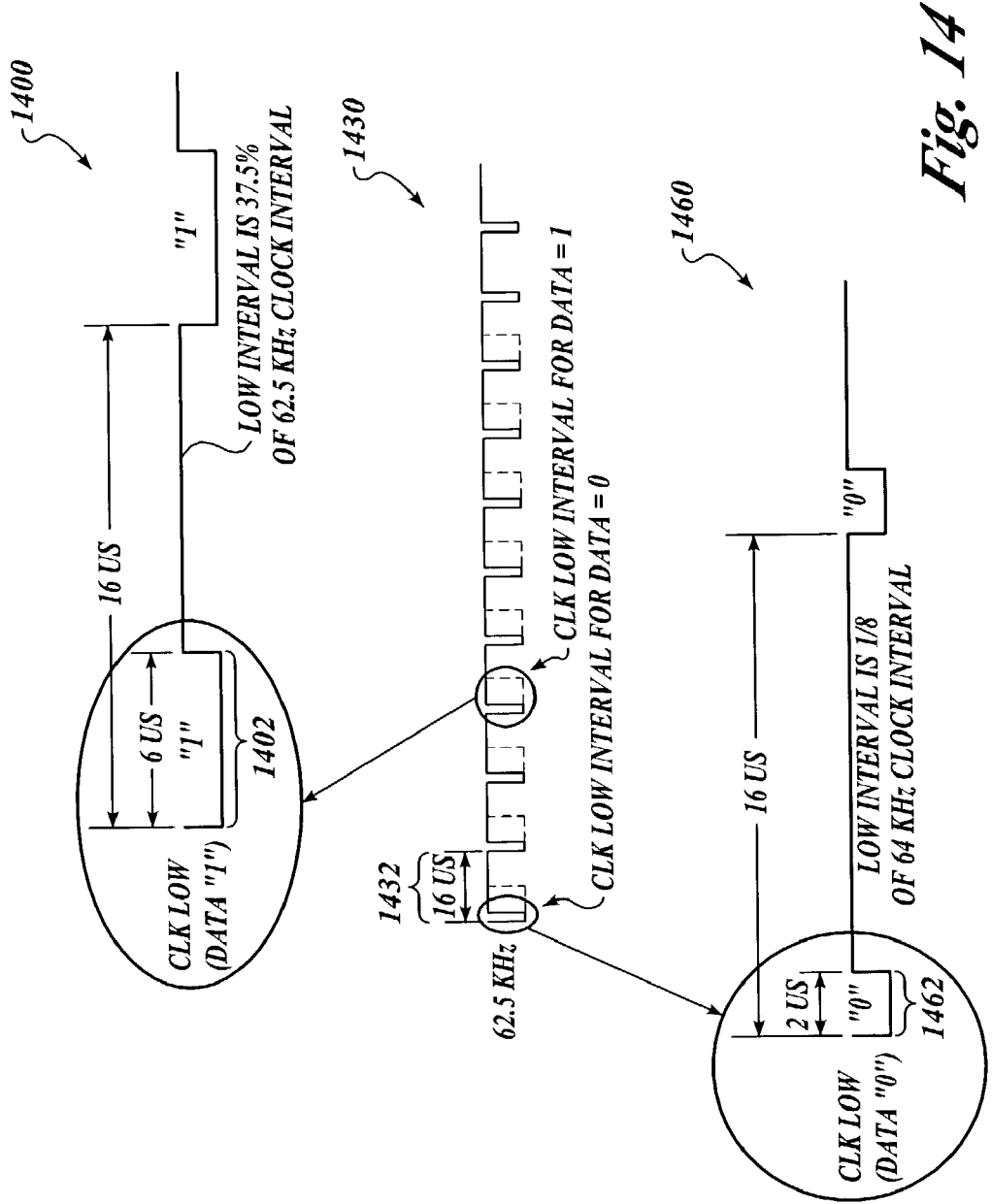
FIG. 14 shows elemental cycle and clock timing interval, data "0" and data "1."

During modulation, the Active readers will provide a nominal 62.5 kHz clock signal to tags in its neighborhood. The tags are synchronized to the Active reader on the negative-going edge of the RF envelope (i.e., the off period of the reader transmission) 1302 in FIG. 13. Each 62.5 kHz clock interval comprises one elemental cycle of a sub-clock and is nominally 16 microseconds (μs) in duration as shown in FIG. 14 at 1432. Binary data from reader to tag is encoded as pulse-width-modulation of the low level pulse between the nominal limits of 2 μs and 6 μs. Preferably the reader clock must be stable to within 1% within any Command Frame. A negative pulse width minimum can vary by plus or minus 1%. Thus, establishing a range for the 2 μs minimum associated with the 62.4 kHz clock to 1.972 μs associated with the 63.36 kHz clock. Negative pulse width will be proportional to modulation frequency as required for operation in Europe. Preferably all other "Elemental Clock Cycle" timing must be proportional to the modulation clock frequency plus or minus 1%.

Modulation Timing

Table 10 contains nominal values for modulation of negative pulse width (RF interruption period) used for data transmission to tags.

TABLE 10

Modulation Timing

| Modulation Timing | |
|---|---|
| 2 μs ± 0.2 μs | reader Logic 0 (rise & fall 300 ns) |
| 4 μs ± 1 μs | tag discrimination point triggered on modulation clock. |
| 6 μs ± 0.2 μs | Reader Logic 1 |
| 10 μs ± 1 μs | Start tag Logic-1 Phase Transition (rise & fall 500 ns) |
| 12 μs ± 1 μs | End tag Logic-1 Phase Transition (rise & fall 500 ns) |
| 2 μs ± 1 μs | Logic-1 Phase Transition Pulse Width |
| 16 μs ± 0.2 μs | Reader Next Modulation Clock Edge |

Clock Timing for reader to tag clocking when data="0" is encoded by a "narrow" 2 μs pulse width modulation of the 62.5 kHz clock as shown in FIG. 14 at 1462. Clock Timing for reader to tag clocking when data="1" is encoded by a "wider" 6 μs pulse width modulation of the 62.5 kHz clock is shown in FIG. 14 at 1402.

Tag-To-Reader Modulation

Figure 15:
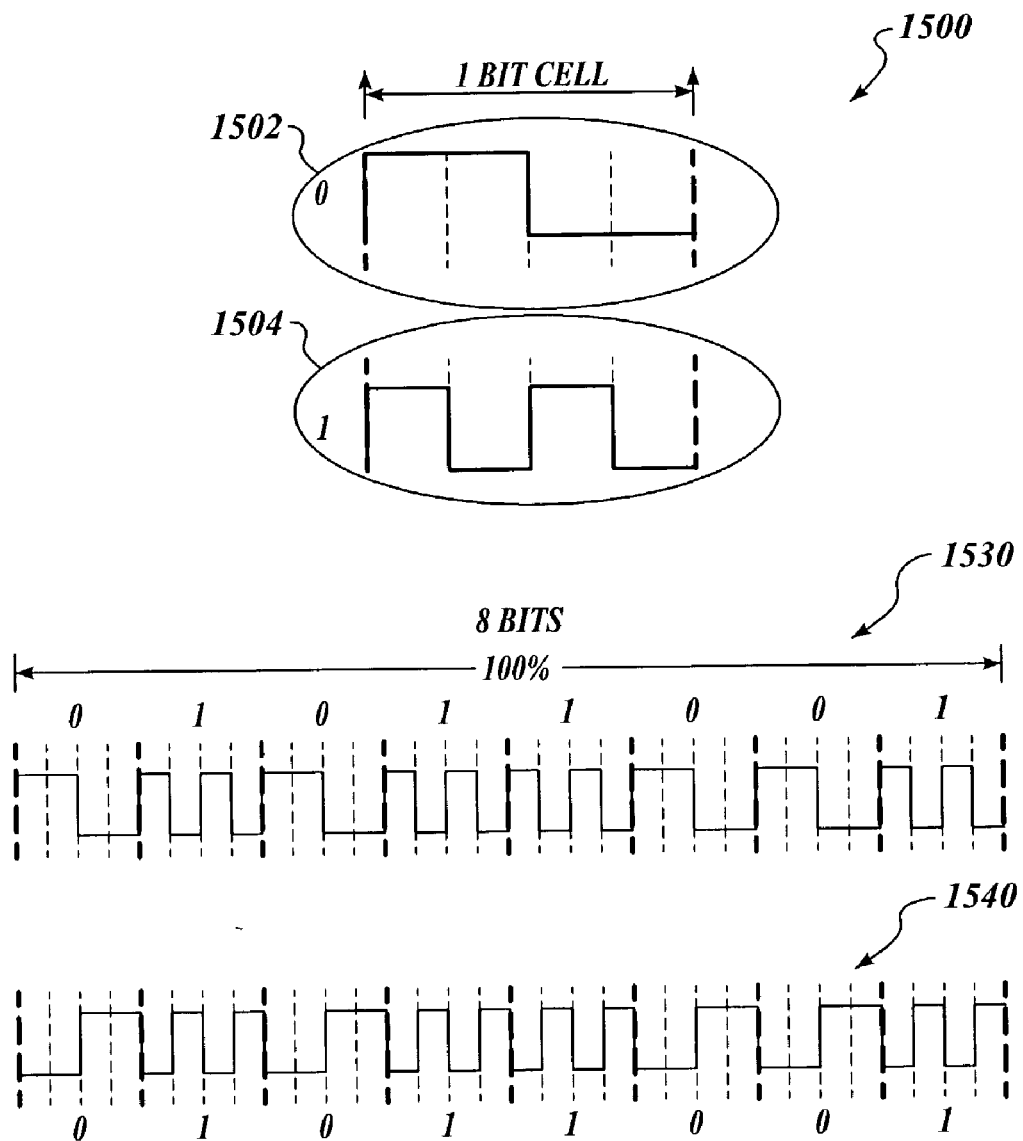
FIG. 15 shows tag-to-reader Bit Cell encoding & 8-Bit Cell tag-to-reader transmission (Inverted.)
Figure 16:
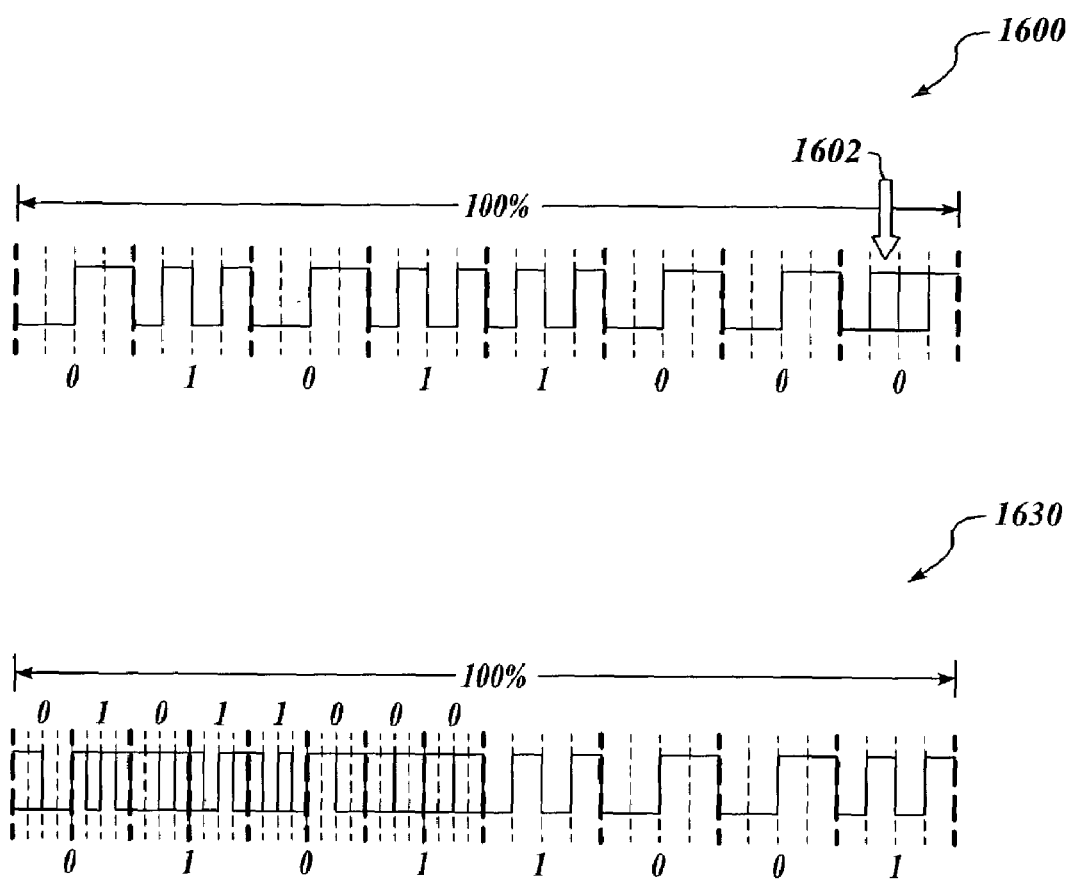
FIG. 16 shows contention with two tags, same clock frequency (1 bit difference) & contention, two tags, 50% difference in clock frequency, 1 bit difference.

In the embodiment under discussion, tags reply to reader commands with backscatter modulation that follows a four (4)-interval bit cell encoding scheme as illustrated in FIG. 15 at 1500. Two (2) transitions are observed for a zero (0) at 1502 and four (4) transitions are observed for a one (1) at 1504 during a Bit Cell. The nominal data rate for tag-to-reader communication is 128,000 bits per second (i.e., 128 kbps) but may vary up to 25% over an 80-bit response window due to possible oscillator drift in the tag. The Bit Cell Time is approximately 8 μs tag-to-reader.

Under this encoding scheme there are always transitions in the middle of a bit and unlike Manchester encoding, the sense of zeros and ones are maintained when the code is inverted as can be seen in FIG. 15. With reference to FIG. 15, an 8-bit sequence of data is represented by 1530 and the inverse of the 8-bit sequence of data is represented by 1540.

Contention Detection

Typically, contention detection is important for most anti-collision algorithms. When two tags have the same clock frequency and the backscatter modulation waveforms from the tags differ by only one bit, the backscatter modulation waveforms yields a difference that should be readily detected by the reader. Such a situation is illustrated in FIG. 16 at 1600. The one-bit difference is identified at 1602 in the example of FIG. 16 where more than two consecutive bits are in the same logic state (e.g. 1). If the two tags do not have the same clock frequency, detection of multi-tag contention becomes even easier. FIG. 16 at 1630 illustrates the difference in signal between two tags that differ by one bit in the modulation with a clock frequency difference of 50%. Contention between tag responses produces a modulation waveform that is a departure from combinations of Bit Cells 1502 and 1504 (FIG. 15).

Reader-Reader Anti-Collision Method for Dense Reader Environments

Managing the interactions of large numbers of both readers and tags is much more complicated in a general purpose supply chain or retail environment than in other closed systems. Low power backscatter modulation signals can be masked by a variety of interference sources in the environment including modulation by other readers.

Figure 17:
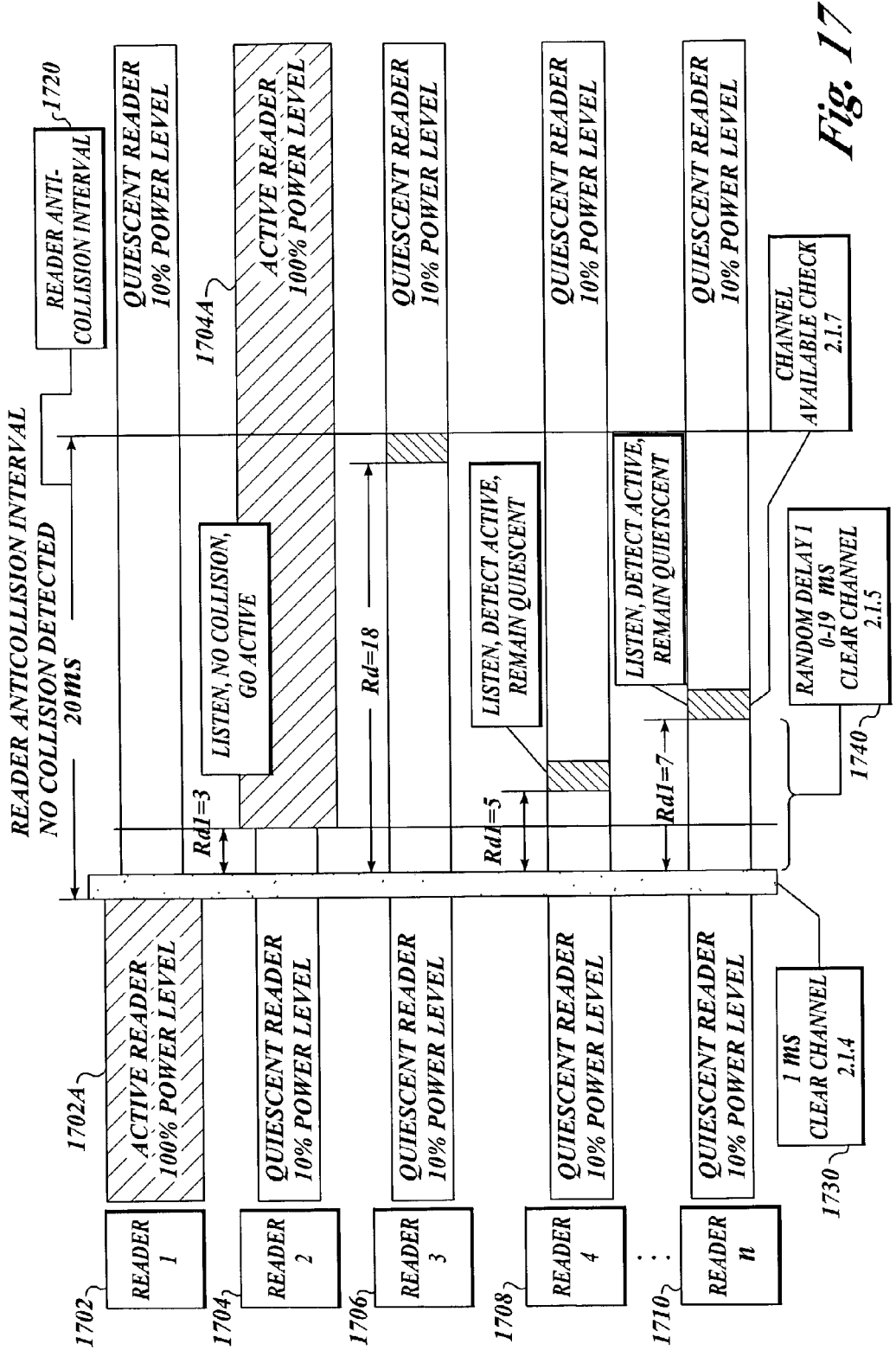
FIG. 17 illustrates reader anti-collision, no collision.

One embodiment for a method to minimize reader-reader interference performs cooperative time-sharing in a local neighborhood. When multiple readers operate in the same immediate space, only one "Active" reader in the "neighborhood" may be operating at full power and in two-way dialog with its tags as shown in FIG. 17 at 1702a and 1704a. Other readers in a less active mode, in the immediate area are called "Quiescent" readers, and are either in an "off" mode or are running continuous wave (CW) at a reduced power level (typically less than 10% of the maximum allowable RF power) as indicated by 1704, 1706, 1708, and 1710. All readers operating in the quiescent mode may have the capability to detect communication initiated between the full power Active reader and tags that are within their antenna pattern. Quiescent readers may maintain their frequency hopping pattern but do not modulate their RF output while in the low power quiescent mode.

When an Active reader completes a communication cycle with the tags within its range, it may cease modulation for a minimum of 20 ms (thereby becoming a Quiescent reader) to ensure that another Quiescent reader has enough time to become Active. The 20 ms period is illustrated on FIG. 17 at 1720.

When Quiescent readers detect an "open neighborhood interval," at 1730 one of them may become Active, go to maximum allowable output power, and begin communicating with neighboring tags. This open interval condition is determined by the absence of any detected Active reader transmissions for a minimum period of 1 ms.

All Quiescent readers wishing to become Active may do so following a pseudo-random delay period of between 0 and 19 ms following the detection of an "open neighborhood interval," as previously described. The pseudo-random delay period is indicated on FIG. 17 at 1740.

Figure 18:
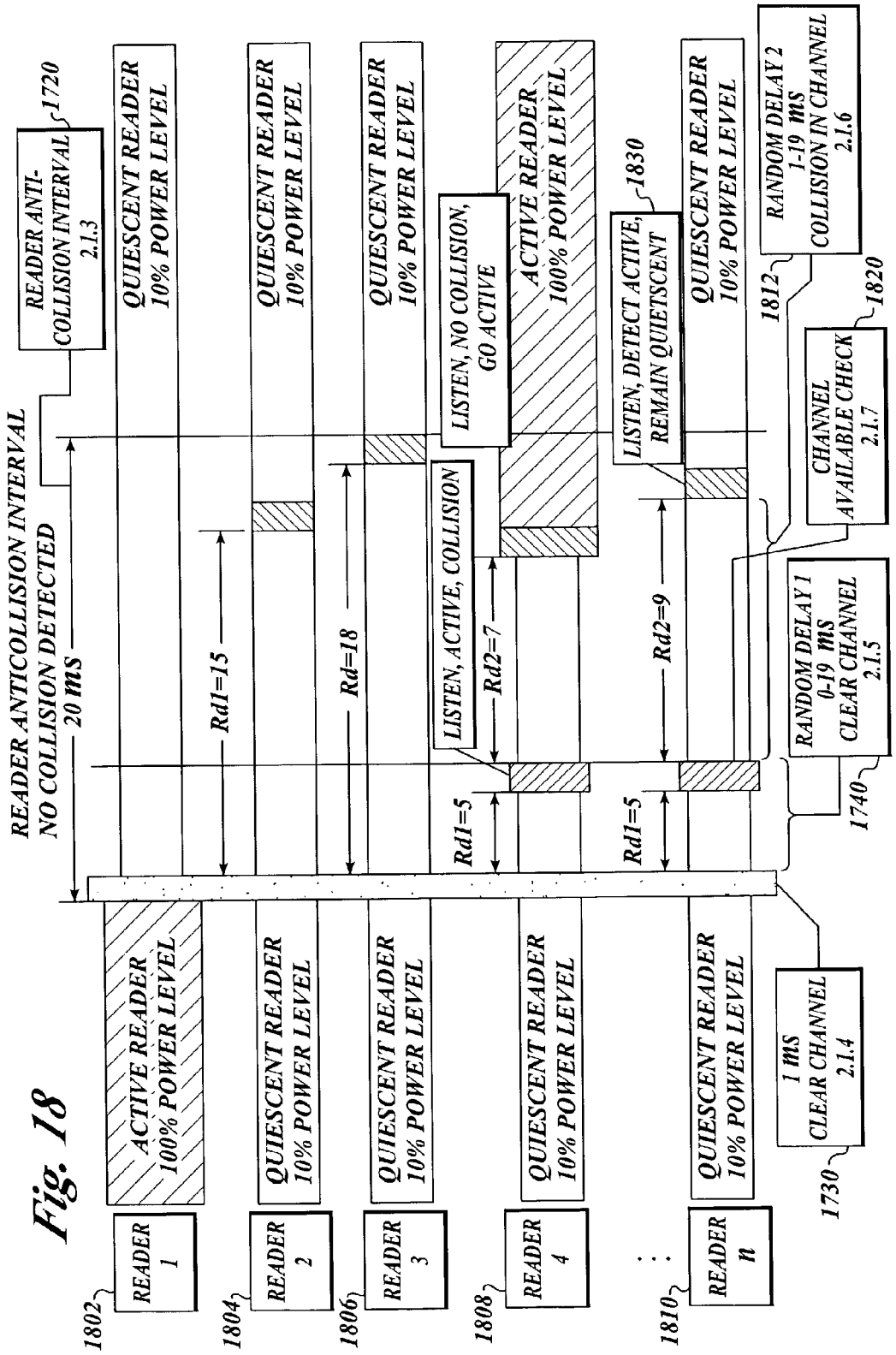
FIG. 18 illustrates reader anti-collision, with collision.

With reference to FIG. 18, if two or more Quiescent readers transition to the Active mode simultaneously in the same neighborhood, for example reader 1808 and 1810, and they detect this condition at 1820, they may immediately return to the quiescent mode. They must then remain in the quiescent mode for a second pseudo-random delay time before attempting to become Active again. This pseudo-random delay time shall be between 1–20 ms, which is noted as Rd2 at 1812.

While delay 1812 is active, the reader 1810 shall listen for another reader becoming Active and if detected at 1830, shall abort the attempt to become active. The reader 1810 shall remain in quiescent mode until the next clear channel interval. The readers shall not transition to active mode outside of the 20 ms interval specified by 1720.

While these readers repeat this pseudo-random delay cycle, all other readers in the neighborhood must remain Quiescent and not attempt to become Active until the detection of the next neighborhood interval. No reader shall transition from Quiescent to Active outside the open detection time interval. In the event the sum of Rd1 at 1740, Rd2 at 1812, plus the 1 ms open channel detection period at 1730 would cause the reader to become active beyond the 20 ms interval specified at 1720, the reader may remain in the quiescent or off state until the next open interval has been detected.

In all cases, rules for the periodicity of interval usage are software configurable for each reader. In all cases, however, Quiescent readers check the availability of a neighborhood interval before transitioning to the Active mode.

Readers may also be equipped with the option of Doppler initiation. In this case, the readers have the ability to detect Doppler signals such as would be caused by movement in the RF field illuminated by a lower power Quiescent mode reader. If no Doppler signal is observed, the reader may assume that no change in the population of the tags in the field of the reader has occurred. As such, no higher power inventory of the population is required and the readers can continue in this low-power mode indefinitely. In some cases a periodic rule can cause a Quiescent reader to become Active. In other cases a combination of Doppler initiation and periodic (or random) initiation can be used to cause a Quiescent reader to become Active. The intent is to minimize power transmission, power consumption, and bandwidth usage.

Figure 19:
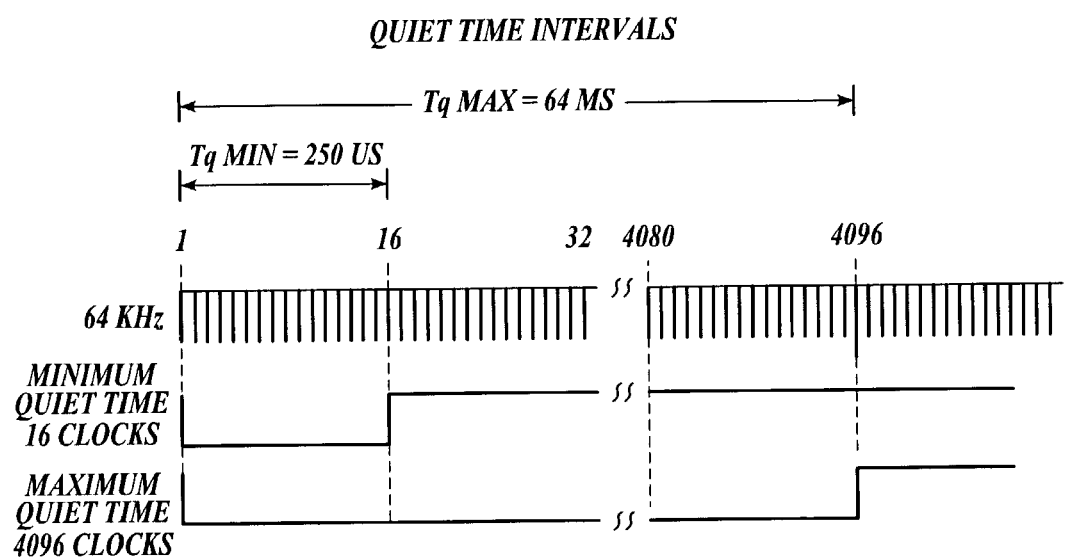
FIG. 19 depicts Quiet Time intervals.

All readers may periodically & simultaneously cease all AM modulation (either carrier shutdown or run CW RF) for periods of at least 16, 62.5 kHz clock periods (256 μs) at intervals of exactly 4096 62.5 kHz clock cycles as illustrated in FIG. 19. The initialization point for the "Macro-Clock Cycle" may be controlled by a "master reader" or other control unit (if present); otherwise this Macro-Clock Cycle will be initiated and controlled by the first reader to go active in the "Store Area" that may be up to 300 meters in extent. These quiet times may vary between 16 (256 µs) and 4096 (65 ms) clock periods. This "quiet time" rule has precedence on any other periodicity or initiation rules. No Quiescent readers shall attempt to become Active during a quiet time. The purpose of the "quiet time" rule is to improve opportunities for other FCC devices to communicate and to facilitate operation of Class-3 tags and Class-4 tags, as well as other long-range devices. Also, the "quiet time" rule facilitates reader-to-reader and reader-to-host interactions and provides a preferred window for frequency hopping.

Before becoming Active for the first time, any reader will first listen through at least one full Macro-Clock Cycle and detect 62.5 kHz modulation from either a master reader, other readers, or other control unit within a range of 300 meters. Each reader will then synchronize its 62.5 kHz modulation to this common time reference, and may become active at the beginning of the next Macro-Clock Cycle.

All reader frequency hopping must occur during the quiet interval of the Macro-Clock Cycle and remain nested at least 1 µs from either the beginning or the end of the quiet time.

Application Layer

As previously described, tags described for use herein will contain an identifier referred to as an address, or an identification code. The term address or code may be used interchangeably; no limitation is implied by the use of one term or the other in the context of the present invention. In one embodiment, the tag address can be 64 bits in length, but may be shorter or longer in other embodiments.

The code may be followed by data stored on the tag. Data may also be stored on a network or the Internet and accessed from the network or the Internet by using the code retrieved from the tag. The data following the code can be accessed and interpreted in a number of ways. For example, the code may be comprised of one or more fields of data that have specific meanings that are understood by the host system that interfaces with the readers.

In addition, data compression techniques may be utilized during programming to minimize the memory size requirements of the tag. Algorithms that reside in the reader, host system or network (including the Internet) can be used to decompress the tag data into a form having more direct meaning to the application. Although implementations may vary, the goal is to automatically link information with physical objects.

Tag Memory Structure

One embodiment of memory organization is described as follows, although other organizations may be implemented. Although tags may be made that have different memory capacities, they may utilize the same organization for at least part of their memory in order to facilitate common identity schemes and search methods if that is a desirable design constraint. In one embodiment, a 96-bit memory organization is illustrated in FIGS. 20A and 20B.

Tag memory can be read-only memory and non-volatile memory or both. For example, the code can be written into the tag by the tag manufacturer. If the tag code is written by the user, then the tag will need to have either non-volatile memory (such as EEPROM) or one-time programmable memory (OPT). A hybrid approach may consist of storing the header, manufacturer, and product fields as read-only memory, and the serial number as EEPROM. The memory requirements of the tag are at least as long as the identification code stored thereon.

The various embodiments stated earlier do not limit the present invention. Different classes of tags can be designed to accommodate different applications and cost requirements. In some embodiments, tags of different classes will be able to work together. Tags may also include a standardized wired input/output (I/O) interface to sensors, clocks, displays and other devices.

Tag Data and Uses

Uses for tags as described herein cover many and diverse applications. For example, tags can be applied at product manufacturing, for encoding and verification. Tags can be logged into an electronic tag database. Work in progress can be tracked within a production facility. Inventory can be managed and controlled with tags, audits may be performed with tags. Tags can be utilized in distribution and warehouse applications, including shipping, receiving, tracking, and routing. Transportation applications exist as well, such as monitoring the coming and going of vehicles.

Anti-counterfeiting applications exist due to the unique identifier contained within the tag.

Retail applications include receiving, inventory management, tracking items within a store as well as antitheft. Theft detection, back and front door, and theft prediction.

Tags may also be capable of being turned off (dead) and being made undead (revivable tags). Tags may be programmed with a destruct sequence, which may be used for consumer privacy.

Tags can be employed in consumer shopping carts, automatic checkout and may be used in an interactive way with consumers at store displays. Special features may include customer loyalty functions, product returns, proof of ownership, warranty, etc.

Readers can be used within the home, post retail, and may be embedded in appliances or furniture such as microwave ovens, refrigerators, countertops, cabinets, washing machines, audio video equipment, and computer equipment.

Tags and readers may be used for waste processing (end of life) sortation, disposal information, recycling information, hazardous material identification, and handling information.

Tags and readers can be used for Aircraft baggage handling, tickets, passes, and licenses.

It is envisioned that a tag or tags may be placed on various different types of objects, such as products in a stream of commerce, and that such tag or tags may be used with any of the various foregoing embodiments. For example, unique tags may be placed on products (e.g. cereal boxes, diaper packages, cans of soup, etc.) in a grocery store or supermarket. Typically, the manufacturer (e.g. CAMBELL'S soup or KELLOGGS) would place a unique tag on each package of a product, and this tag can then be used to maintain an inventory in a warehouse or on a truck (or other shipping entity) or in a store (e.g. grocery store or supermarket or clothing store, etc.).

Further, the tag may be used to "checkout" the product from a store (in a manner which is similar to the conventional use of printed bar codes on products, which bar codes are scanned at a point of purchase such as a checkout counter in a supermarket). Whether maintaining an inventory or checking out products, the tag is read by a reader to obtain the tag's unique code. The unique code can be used to identify the product through a lookup operation in a database that associates the code with other information such as product name, product specifications, retail price, etc. Each tag for each sample of a product (e.g. each box of FROSTED FLAKES cereal) may have a unique identification code or, alternatively, tags intended for the same product (e.g. each 16 oz. box of FROSTED FLAKES cereal) have the same identification code.

Tags may be placed on household appliances, such as toasters, coffeemakers, TVs, DVD players, etc., and when the appliance, with its tag, is brought into a household, a reader may interrogate the tag which can then be configured to work with other appliances in the household (particularly one in which there is a local area network (LAN) or a local operating network (LON)).

Communication with tags (e.g. between tag and reader) need not be only wireless. The communication medium may be wireless or wired. For example, a wired connection over household power lines or a bus may be used rather than a wireless connection.

Some of the above noted algorithms bisect a number space in order to search for tags. It will be appreciated that other divisions of a number space may be more efficient. Thus rather than bisecting (dividing by 2) a number space (which produces a large bisected space to search when the space is initially very large, such as $2^{64}$ possible tag identifier codes), algorithms of the invention may split the space into smaller portions (e.g. $1/50^{th}$ or $1/100^{th}$ of the number space and search these smaller portions).

In light of the present disclosure, it will be appreciated that the methods described in conjunction with the figures may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions that may be used to program a computer (or other electronic devices) to perform the methods.

For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Furthermore, it is common in the art to speak of software, in one form or another (e.g., program, procedure, process, application, module, logic), as taking an action or causing a result. Such expressions are merely a shorthand way of saying that execution of the software by a computer causes the processor of the computer to perform an action or a produce a result.

Possible Modifications

Both the amount and type of data might vary in a "ping" or "scroll" tag response. For example the tag "ping" may include single bits, groups of 16-bits, more than 16 bits, or non-ID information (like pseudo-random security codes, error correction codes, stored data, sensor data, etc.) as well as the 8-bit group of identity code information described in one embodiment. Likewise the "scroll" may include any- where from 2 to hundreds of bits, may include CRC error correction code information, security codes, stored data, sensor data, etc.

All the parameters of this protocol may be changed to fit various applications, including: the number of bins, the type and length of downloaded commands, the backscatter data rates, and whether the reader extracts all the data from the tag response or only a part thereof (which often depends on how noisy the environment is). The backscattering data rate may range from less than the downlink rate of typically 16 KHz for Europe to 64–80 KHz for USA, to the 128 KHz in one embodiment, to 256 KHz or higher in certain embodiments. The backscattering data rate can also be a non-integer multiple of the downlink data/clock rate—in one example the downlink could be at 80 KHz and the backscatter data rate could be at 130 KHz.

Certain embodiments may use a "fast scrolling" mode of operation, wherein two or more varieties of "bit clocks" (which may, for example, be referred to as "bin-0" and "bin-1") are used. The "bin-0" clock operates just like the existing bin clock. However, if the reader determines that the last ping came from a single tag it may immediately send to that tag a "bin-1" clock that causes the tag that had just sent the last "ping" to immediately resume backscattering all of its remaining ID and CRC information—in effect entering a fast partial "scroll" mode. All other tags (except for the one that had just completed its "ping" response) will ignore this "bin-1" signal from the reader. When this "partial scroll" is completed the reader will then send down a "bin-0" that allows any tag or tags in the next bin to respond. In this way, at least one and as many as 8–16 tags can be fully identified with a single reader command which could dramatically speed up the tag identification search rate.

Also, certain embodiments may make use of short (typically 4-bits, but could range from 1-bit to 80-bit) "suffix" commands that operate only on the tag that had just completed a scroll back to the reader. These commands could include either a SLEEP command or a SLEEP command conditioned on a code match such as a 16-bit CRC code. Other suffix commands could include READ, WRITE, etc. The key advantage of these suffix commands is that they can operate many times faster than sending down a full 131-bit tag-specific command directly from the reader.

Thus, novel methods and apparatuses for identification are described. Although the invention is described herein with reference to specific preferred embodiments, many modifications therein will readily occur to those of ordinary skill in the art. Accordingly, all such variations and modifications are included within the intended scope of the invention as defined by the following claims. The specification and drawings are, accordingly, to be regarded in an illustrated sense rather than a restrictive sense.

The invention claimed is:

1. A method performed by a reader of a plurality of readers to identify a tag of a plurality of tags, each tag of the plurality of tags having an identification code, said method comprising:

entering a quiescent mode in response to a first reader of the plurality of readers entering an active mode to perform a communication cycle, said first reader entering a quiescent mode for a first interval of time after completing said communication cycle; and entering an active mode after detecting an absence of active reader transmissions for a second interval of time and after a first pseudo-random delay period.

2. The method of claim 1, further comprising:
   entering the quiescent mode in response to a detecting another reader of the plurality of readers simultaneously entering an active mode; and
   entering an active mode for a second time after detecting an absence of active reader transmissions during the first pseudo-random delay period and after a second pseudo-random delay period has elapsed.

3. The method of claim 2, wherein entering an active mode for a second time does not occur if the first interval of time has elapsed.

4. A machine readable medium containing executable instructions that when executed by a machine of a reader of a plurality of readers cause said machine to perform operations comprising:
   entering a quiescent mode in response to a first reader of the plurality of readers entering an active mode to perform a communication cycle, said first reader entering a quiescent mode for a first interval of time after completing said communication cycle; and
   entering an active mode after detecting an absence of active reader transmissions for a second interval of time and after a first pseudo-random delay period.

5. The machine readable medium of claim 4, containing further executable instructions that when executed by said machine cause said machine to perform operations comprising:
   entering the quiescent mode in response to a detecting another reader of the plurality of readers simultaneously entering an active mode; and
   entering an active mode for a second time after detecting an absence of active reader transmissions during the first pseudo-random delay period and after a second pseudo-random delay period has elapsed.

6. The machine readable medium of claim 5, wherein entering an active mode for a second time further comprises entering an active mode for a second time before the first interval of time has elapsed.

7. A reader of a plurality of readers to identify a tag of a plurality of tags, each tag of the plurality of tags having an identification code, said reader comprising:
   means for entering a quiescent mode in response to a first reader of the plurality of readers entering an active mode to perform a communication cycle, said first reader entering a quiescent mode for a first interval of time after completing said communication cycle; and
   means for entering an active mode after detecting an absence of active reader transmissions for a second interval of time and after a first pseudo-random delay period.

8. The reader of claim 7, further comprising:
   means for entering the quiescent mode in response to a detecting another reader of the plurality of readers simultaneously entering an active mode; and
   means for entering an active mode for a second time after detecting an absence of active reader transmissions during the first pseudo-random delay period and after a second pseudo-random delay period has elapsed.

9. The reader of claim 7, wherein said means for entering an active mode for a second time further comprises entering an active mode for a second time after detecting an absence of active reader transmissions during the first pseudo-random delay period and after a second pseudo-random delay period has elapsed and before the first interval of time has elapsed.

10. A first reader of a plurality of readers to identify a tag of a plurality of tags, each tag of the plurality of tags having an identification code, said first reader comprising:
    a transmitter to transmit a first signal when entering an active mode to perform a first communication cycle;
    a receiver to receive a second signal from a second reader of the plurality of readers entering an active mode to perform a second communication cycle, said second reader entering a quiescent mode for a first interval of time after completing said second communication cycle; and
    a processor to let said first reader enter a quiescent mode in response to said second signal from said second reader, and to let said first reader enter an active mode after detecting an absence of active reader transmissions for a second interval of time and after a first pseudo-random delay period.

11. The reader of claim 10, wherein said processor further comprising:
    entering the quiescent mode in response to a detecting another reader of the plurality of readers simultaneously entering an active mode; and
    entering an active mode for a second time after detecting an absence of active reader transmissions during the first pseudo-random delay period and after a second pseudo-random delay period has elapsed.

12. The reader of claim 10, wherein said processor further comprises:
    entering an active mode for a second time after detecting an absence of active reader transmissions during the first pseudo-random delay period and after a second pseudo-random delay period has elapsed and before the first interval of time has elapsed.

* * * * *